(12) United States Patent
Tanaka et al.

(10) Patent No.: US 6,552,737 B1
(45) Date of Patent: Apr. 22, 2003

(54) CONTROL OF WINDOW SIZE IN RESPONSE TO USER OPERATION

(75) Inventors: Harutaka Tanaka, Fukuoka (JP); Shuji Iwasaki, Fukuoka (JP); Takao Shikama, Fukuoka (JP); Yoshito Taniyama, Fukuoka (JP); Yoshimasa Sekiya, Fukuoka (JP); Hirofumi Kobayashi, Fukuoka (JP); Koji Mikami, Fukuoka (JP); Masayoshi Kamada, Fukuoka (JP); Shinichi Tabe, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/387,832

(22) Filed: Sep. 1, 1999

(30) Foreign Application Priority Data

Feb. 18, 1999 (JP) .............................. 11-040142

(51) Int. Cl.$^7$ ................................ G06F 3/14
(52) U.S. Cl. ................ 345/781; 345/784; 345/764; 345/786; 345/800; 345/862; 345/856
(58) Field of Search ................. 345/781, 784, 345/856, 862, 764, 786, 800, 801, 157, 772

(56) References Cited

U.S. PATENT DOCUMENTS

| | | | | | |
|---|---|---|---|---|---|
| 4,819,189 A | * | 4/1989 | Kikuchi et al. | ............. | 395/345 |
| 5,001,697 A | * | 3/1991 | Torres | ......................... | 395/139 |
| 5,226,117 A | * | 7/1993 | Miklos | ........................ | 345/356 |
| 5,227,771 A | * | 7/1993 | Kerr et al. | .................. | 345/119 |
| 5,434,964 A | * | 7/1995 | Moss et al. | .................. | 395/342 |
| 5,553,225 A | * | 9/1996 | Perry | ......................... | 395/341 |
| 5,737,507 A | * | 4/1998 | Smith | ........................ | 345/433 |
| 5,841,435 A | * | 11/1998 | Dauerer et al. | ............. | 345/339 |
| 5,943,053 A | * | 8/1999 | Ludolph et al. | ............ | 345/342 |
| 6,353,449 B1 | * | 3/2002 | Gregg et al. | ................ | 345/762 |

FOREIGN PATENT DOCUMENTS

| | | |
|---|---|---|
| JP | 58-7182 | 1/1993 |
| JP | 7-219700 | 8/1995 |
| JP | 8-221196 | 8/1996 |
| JP | 9-106336 | 4/1997 |
| JP | 10-124287 | 5/1998 |

* cited by examiner

Primary Examiner—Kristine Kincaid
Assistant Examiner—Thomas T. Nguyen
(74) Attorney, Agent, or Firm—Staas & Halsey L.L.P.

(57) ABSTRACT

A device for controlling multi-window display on a screen includes a screen-operation detecting unit which detects user screen operations including a user operation of a pointer on the screen. The device further includes a control unit which controls a window to increase an amount of information displayed therein when said screen-operation detecting unit detects a move of the pointer into an area of the window.

21 Claims, 27 Drawing Sheets

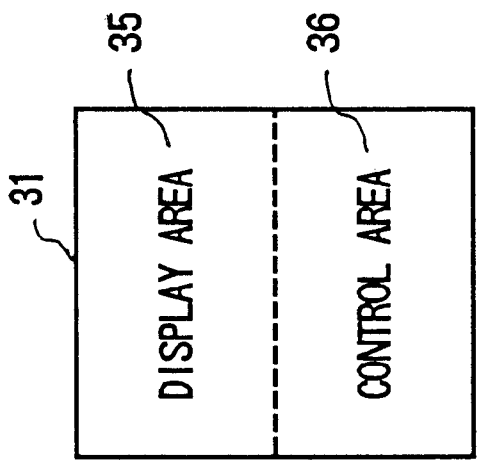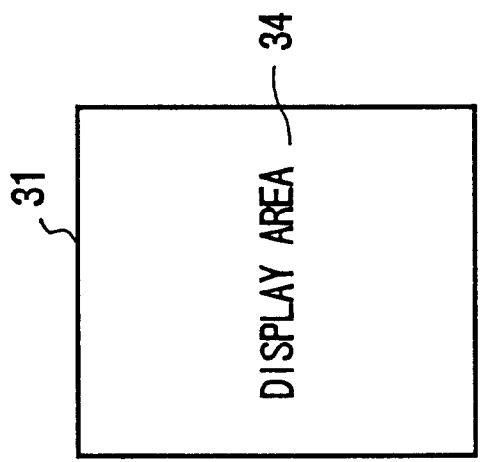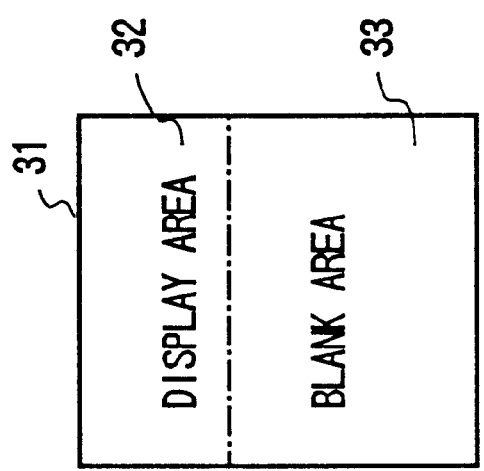

FIG. 4

| ENLARGEMENT FLAG | 1 : ENLARGED |
|---|---|
| | 0 : STANDARD |

FIG. 5

| COORDINATES OF TOP-LEFT CORNER (a,b) |
|---|
| WIDTH (x) |
| HEIGHT (y) |

FIG. 6

| LINE NUMBER |
|---|

FIG. 7

| "CHARACTER STRING    " |
|---|

FIG. 8

| COORDINATES OF TOP-LEFT CORNER (a,b) |
|---|
| WIDTH (x) |
| HEIGHT (y) |

FIG. 9

| TIME PERIOD t1 |  UNIT : SECOND |
|---|---|

FIG. 10

| CURRENT TIME tn | yyyy/mm/dd hh:mm:ss |
|---|---|
| TIME-COUNTING START TIME t0 | YEAR MONTH DAY HOUR NINUTE SECOND CONUERTED INTO AN INTEGER NUMBER |

- DISPLAY-STATUS-CONTROL INFORMATION

| ENLARGEMENT FLAG | 0 (STANDARD) |

- DISPLAY-AREA FRAME 21

| COORDINATES OF TOP-LEFT CORNER (a1,b1) | (200, 200) |
| WIDTH (x1) | 400 |
| HEIGHT (y1) | 300 |

- DISPLAY-CONDITION SETTING AREA 22

| COORDINATES OF TOP-LEFT CORNER (a1,b1) | (200, 200) |
| WIDTH (x1) | 400 |
| HEIGHT (y2) | 100 |

- CONTENT-DISPLAY AREA 23

| COORDINATES OF TOP-LEFT CORNER (a3,b3) | (200, 300) |
| WIDTH (x3) | 380 |
| HEIGHT (y3) | 200 |

- SCROLL BAR 24

| COORDINATES OF TOP-LEFT CORNER (a4,b4) | (580, 300) |
| WIDTH (x4) | 20 |
| HEIGHT (y3) | 200 |

F I G. 1 5
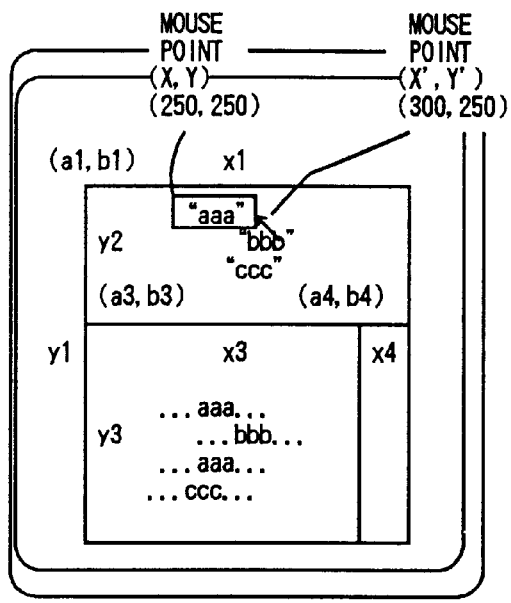

- DISPLAY-AREA FRAME 21

| COORDINATES OF TOP-LEFT CORNER (a1,b1) | (200, 200) |
|---|---|
| WIDTH (x1) | 400 |
| HEIGHT (y1) | 300 |

- CONTENT-DISPLAY AREA 23

| COORDINATES OF TOP-LEFT CORNER (a1,b1) | (200, 200) |
|---|---|
| WIDTH (x3) | 380 |
| HEIGHT (y1) | 300 |

- SCROLL BAR 24

| COORDINATES OF TOP-LEFT CORNER (a4,b1) | (580, 200) |
|---|---|
| WIDTH (x4) | 20 |
| HEIGHT (y1) | 300 |

- DISPLAY-STATUS-CONTROL INFORMATION

| ENLARGEMENT FLAG | 0 (ENLARGED) |
|---|---|

- DISPLAYED-CONTENT SCREENING INFORMATION

| CHARACTER STRING | "aaa" |
|---|---|

FIG. 18

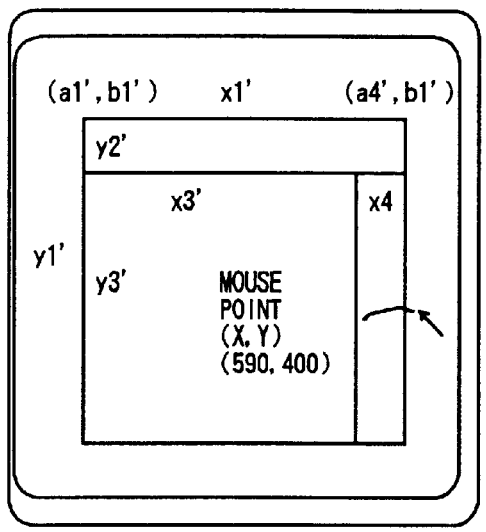

- DISPLAY-STATUS-CONTROL INFORMATION

| ENLARGEMENT FLAG | 1 (ENLARGED) |

- DISPLAY-AREA FRAME 21

| COORDINATES OF TOP-LEFT CORNER (a1',b1') | (200, 200) |
| WIDTH (x1') | 400 |
| HEIGHT (y1') | 400 |

- DISPLAY-CONDITION SETTING AREA 22

| COORDINATES OF TOP-LEFT CORNER (a1',b1') | (200, 200) |
| WIDTH (x1') | 400 |
| HEIGHT (y2') | 100 |

- CONTENT-DISPLAY AREA 23

| COORDINATES OF TOP-LEFT CORNER (a1',b1') | (200, 200) |
| WIDTH (x3') | 380 |
| HEIGHT (y3') | 300 |

- SCROLL BAR 24

| COORDINATES OF TOP-LEFT CORNER (a4',b1') | (580, 300) |
| WIDTH (x4') | 20 |
| HEIGHT (y3') | 300 |

FIG. 19

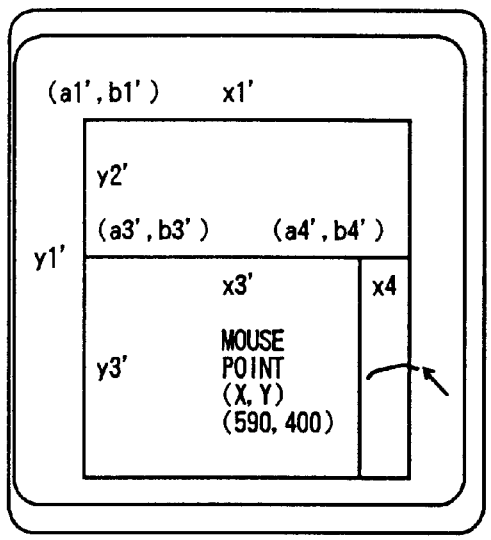

- DISPLAY-AREA FRAME 21

| | |
|---|---|
| COORDINATES OF TOP-LEFT CORNER (a1', b1') | (200, 200) |
| WIDTH (x1') | 400 |
| HEIGHT (y1') | 300 |

- DISPLAY-CONDITION SETTING AREA 22

| | |
|---|---|
| COORDINATES OF TOP-LEFT CORNER (a1', b1') | (200, 200) |
| WIDTH (x1') | 400 |
| HEIGHT (y2') | 100 |

- CONTENT-DISPLAY AREA 23

| | |
|---|---|
| COORDINATES OF TOP-LEFT CORNER (a3', b3') | (200, 300) |
| WIDTH (x3') | 380 |
| HEIGHT (y3') | 200 |

- SCROLL BAR 24

| | |
|---|---|
| COORDINATES OF TOP-LEFT CORNER (a4', b4') | (580, 300) |
| WIDTH (x4) | 20 |
| HEIGHT (y3) | 200 |

- DISPLAY-STATUS-CONTROL INFORMATION

| ENLARGEMENT FLAG | 0 (STANDARD) |
|---|---| y2' = y2'
b3' = b1+y2'
a4' = a3'+x3'
    = a1'+x3'

- DISPLAY-AREA FRAME 21

| COORDINATES OF TOP-LEFT CORNER (a1,b1) | (200, 200) |
|---|---|
| WIDTH (x1) | 400 |
| HEIGHT (y1) | 300 |

- CONTENT-DISPLAY AREA 23

| COORDINATES OF TOP-LEFT CORNER (a1,b1) | (200, 200) |
|---|---|
| WIDTH (x3) | 380 |
| HEIGHT (y1) | 300 |

- SCROLL BAR 24

| COORDINATES OF TOP-LEFT CORNER (a4,b1) | (580, 200) |
|---|---|
| WIDTH (x4) | 20 |
| HEIGHT (y1) | 300 |

- DISPLAY-STATUS-CONTROL INFORMATION

| ENLARGEMENT FLAG | 1 (ENLARGED) |
|---|---|

- RESTORING-DISPLAY INFORMATION

| LINE-TO BE DISPLAYED AT TOP | 100-th |
|---|---|

CONTROL OF WINDOW SIZE IN RESPONSE TO USER OPERATION

BACKGROUND OF THE INVENTION

1. Field of the Invention

The present invention generally relates to a display-control device, a method of controlling display, and memory medium having a display-control program recorded therein. The present invention particularly relates to a display-control device, a method of controlling display, and memory medium having a display-control program recorded therein which can automatically enlarge or reduce a size of a display area in accordance with provided conditions.

2. Description of the Related Art

When there is a need to display information that has a larger size than what can be displayed on a current display area on a screen, a function to change a window size is activated to resize the window, and a function to scroll a window is used for finding a desired portion of the contents and having it displayed within the window.

In a case where a plurality of windows are displayed, a window-manager function is employed to switch an active window and resize the window when there is a need to refer to the displayed contents of an inactive window.

There are several schemes for displaying information larger in size than what can be displayed on a display area. One of such schemes is disclosed in Japanese Patent Laid-open Application No. 58-7182. According to the scheme of this document, a window area is enlarged when there is a space in a screen as shown in FIG. 1A. Namely, if a blank area 33 exists in addition to a display area 32, the display area 32 is enlarged to cover the entirety of a screen area 31 as shown in FIG. 1B. The enlarged display area is shown as a display area 34. If another display area such as a control area 36 exists when a display area 35 needs to be enlarged as shown in FIG. 1C, however, the display area 35 cannot be enlarged to cover the full screen.

Other schemes are disclosed in Japanese Patent Laid-open Applications No. 7-219700 and No. 9-106336. According to the schemes of these documents, a user handles an operation for enlarging a display area, and a new window is displayed to show desired contents. In FIG. 2A, for example, displaying details of a device C is desired. In this case, a mouse operation is performed with respect to the device C (e.g., a click operation on a box representing the device C), so that details of the device C are displayed as shown in FIG. 2B. A further mouse operation may be performed on the displayed details, so that further information (i.e., troubleshooting for a device malfunction in this example) is obtained.

The scheme disclosed in the Japanese Patent Laid-open Application No. 58-7182 is directed to an enlargement of a display area in a single-window environment. This scheme does not relate to a multi-window environment that is a mainstream software environment at present, and is not the best way to solve the problem in such a multi-window environment.

An automatic enlargement of a display size can be carried out in situations such as shown in FIG. 1A to achieve enlarged display as shown in FIG. 1B. In the situation as shown in FIG. 1C, however, an enlargement of a display size is not possible. Further, no means is provided for a user to specify conditions under which an enlargement/restoration of a display size is carried out.

The schemes disclosed in Japanese Patent Laid-open Applications No. 7-219700 and No. 9-106336 allow a user to perform a mouse operation at a position indicative of desired information and open a new window for displaying the information. This eliminates a need for user operations of resizing/switching a display window at each step, but ends up hiding other windows by opening the new window. When user wishes to display other information or wishes to consult information displayed on other windows, resizing/switching operations are necessary.

Accordingly, there is a need for a display-control scheme that provides a better manipulability for display enlargement operations. In particular, there is a need for providing a display-control device, a method of controlling display, and memory medium having a display-control program recorded therein which can automatically enlarge a display area without an express request from a user when such an enlargement is appropriate, and, also, can automatically restore the original display area when such restoration is proper.

SUMMARY OF THE INVENTION

Accordingly, it is a general object of the present invention to provide a display-control device, a method of controlling display, and memory medium having a display-control program recorded therein which can satisfy the needs described above.

It is another and more specific object of the present invention to provide a display-control device, a method of controlling display, and memory medium having a display-control program recorded therein which can automatically enlarge a display area without an express request from a user when such an enlargement is appropriate, and, also, can automatically restore the original display area when such restoration is proper.

In order to achieve the above objects according to the present invention, a device for controlling multi-window display on a screen includes a screen-operation detecting unit which detects user screen operations including a user operation of a pointer on the screen. The device further includes a control unit which controls a window to increase an amount of information displayed therein when said screen-operation detecting unit detects a move of the pointer into an area of the window.

In the device as described above, a user operation moving a pointer into an area of a given window is regarded as a request for display enlargement, and the given window is enlarged, or has an increased amount of information displayed therein (e.g., by showing the contents in a reduced size so as to squeeze more information within a constant window size).

Alternatively, the user operation for implicitly requesting display enlargement may be a stay of the pointer inside the window for a predetermined time period, or may be a click on a scroll bar of the window.

Regardless of which one of the user operations described above is defined as a request for display enlargement, the present invention treats a user operation without an express request for display enlargement as an implicit request for display enlargement. Namely, a mouse movement into a window area may indicate the user's intention to operate the window. To avoid capricious window enlargements as a mouse pointer moves around on the display screen, it may be reasonable to require the mouse pointer to stay inside the display area for more than a predetermined time period before interpreting the mouse movement as the user's intention to operate the display area. Alternatively, a mouse click on a scroll bar may be interpreted as a request for display enlargement.

Further, the window is restored to its original state (e.g., its original size) when a pointer moves out of the window area or when no user operation is detected for a predetermined time period. Namely, restoration of a window is initiated when there is a sign that the user no longer intends to operate the enlarged window.

In this manner, the present invention automatically enlarges a display area without an express request from a user when such an enlargement is appropriate, and, also, automatically restores the original display area when such restoration is proper.

Other objects and further features of the present invention will be apparent from the following detailed description when read in conjunction with the accompanying drawings.

BRIEF DESCRIPTION OF THE DRAWINGS

FIGS. 1A through 1C are illustrative drawings showing an example of related-art window enlargement;

FIG. 4 is an illustrative drawing showing a data structure of display-status-control information;

FIG. 5 is an illustrative drawing showing a data structure of display-area-coordinate information;

FIG. 6 is an illustrative drawing showing a data structure of restoring-display information;

FIG. 7 is an illustrative drawing showing a data structure of displayed-contents screening information;

FIG. 8 is an illustrative drawing showing a data structure of display-area-restoration-control information;

FIG. 9 is an illustrative drawing showing a data structure of specified-time information;

FIG. 10 is an illustrative drawing showing a data structure of current-time information;

FIG. 15 is an illustrative drawing showing display-status-control information, display-area-coordinate information, and displayed-contents screening information during a standard-status period;

FIG. 18 is an illustrative drawing showing display-status-control information and display-area-coordinate information during a enlarged-status period;

FIG. 19 is an illustrative drawing showing display-status-control information and display-area-coordinate information during a standard-status period as well as a conversion formulae used for display restoration;

DESCRIPTION OF THE PREFERRED EMBODIMENTS

In the following, embodiments of the present invention will be described with reference to the accompanying drawings.

Figure 2A:
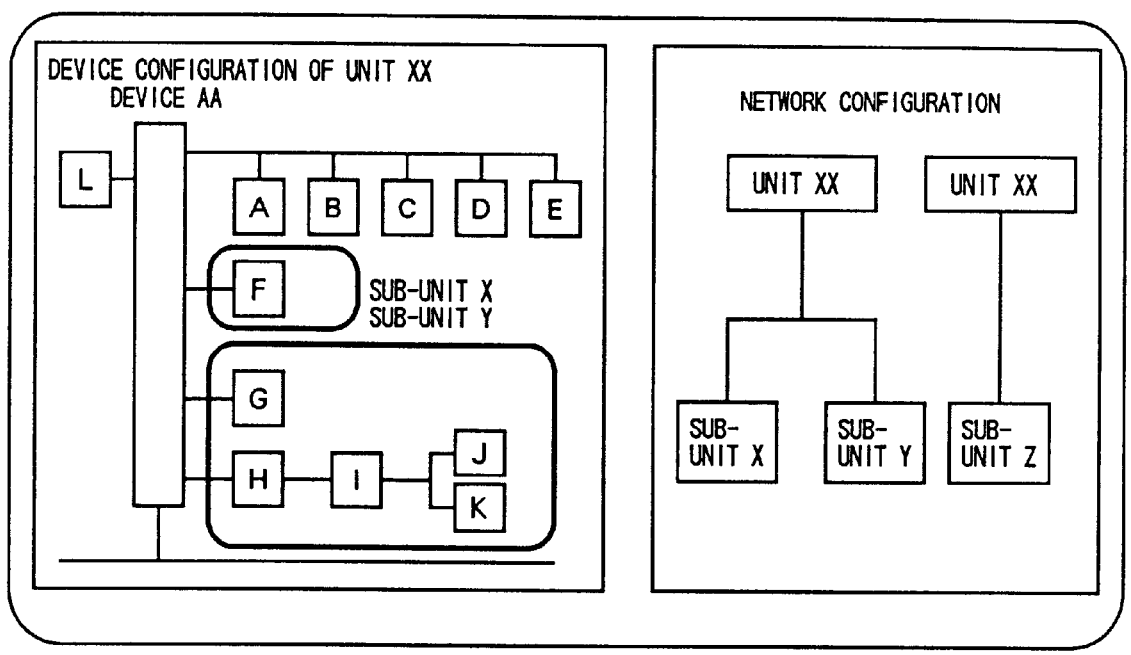
FIGS. 2A and 2B are illustrative drawings showing another example of related-art window operations.
Figure 2B:
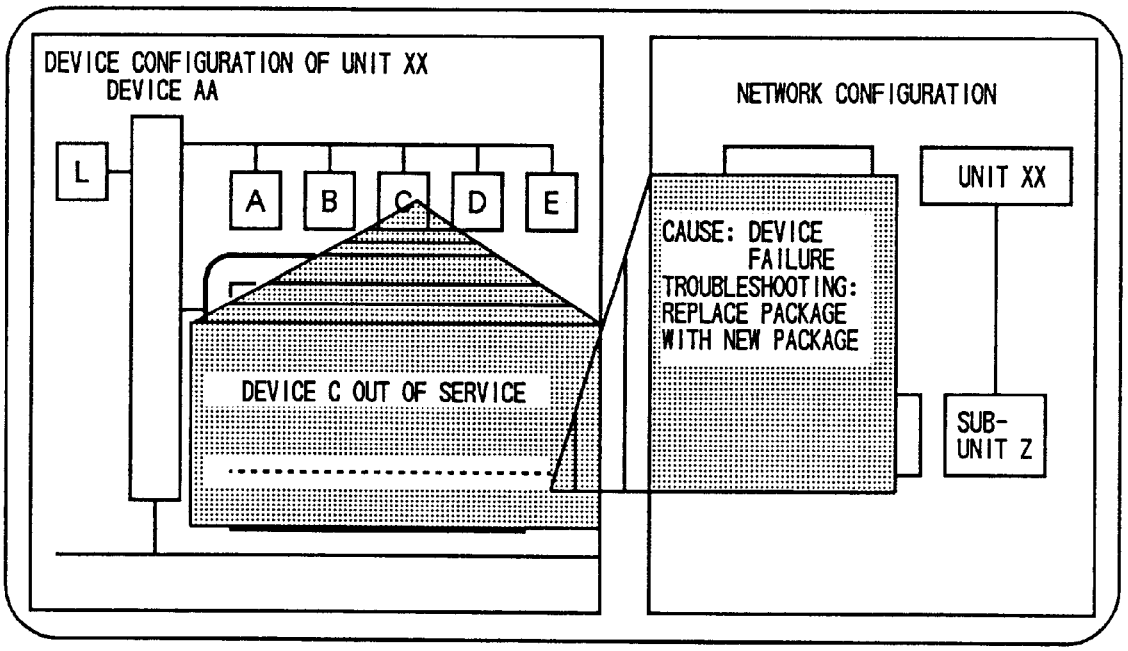
Figure 3:
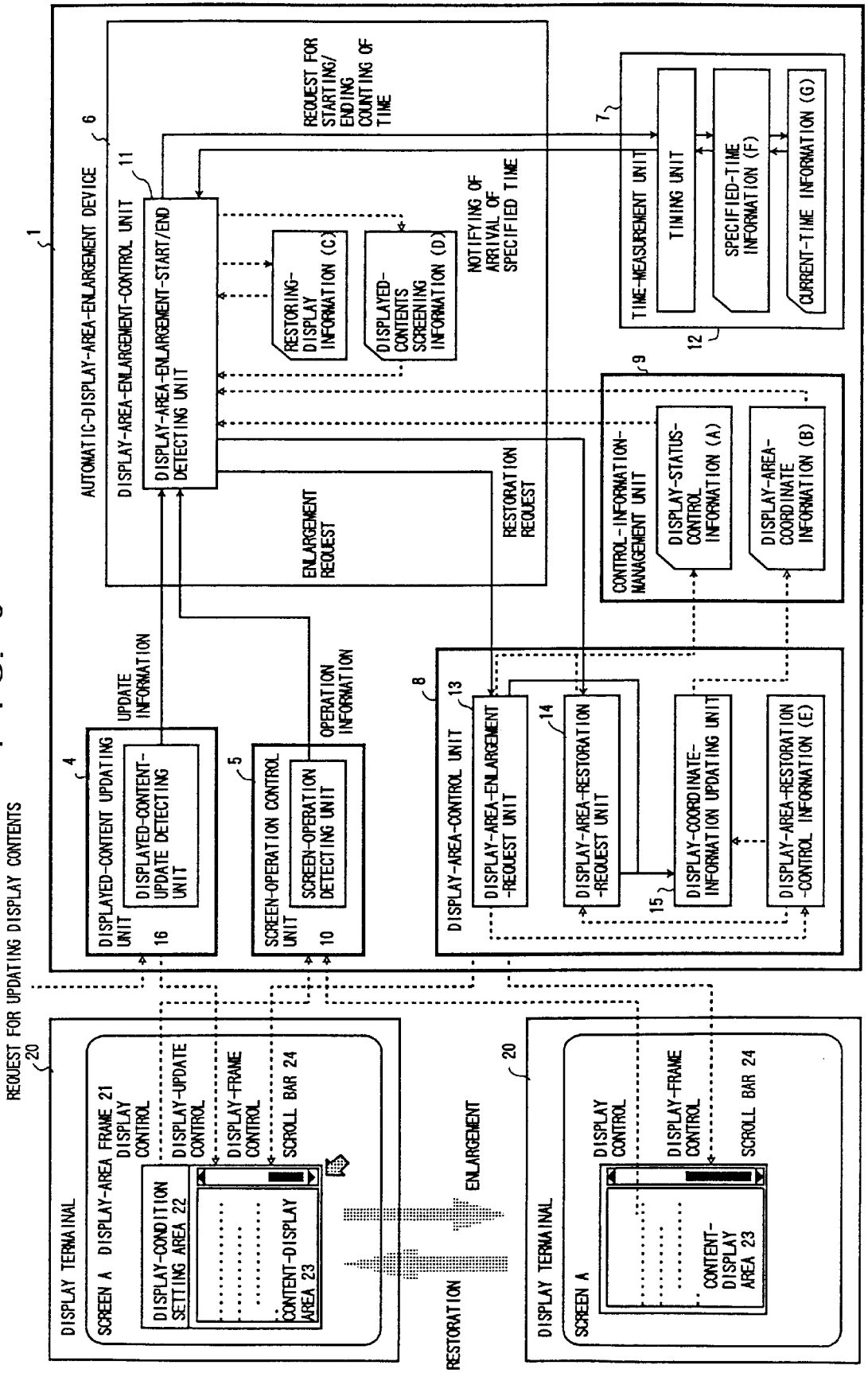
FIG. 3 is a block diagram showing a configuration of an automatic-display-area-enlargement device according to the present invention.

FIG. 3 is a block diagram showing a configuration of an automatic-display-area-enlargement device according to the present invention.

A screen A of a display terminal 20 includes a display-area frame 21 defining a frame of a display area, a display-condition setting area 22 for making settings to conditions for desired display information, and a content-display area 23 for displaying the desired information according to the conditions. The content-display area 23 is provided with a scroll bar 24 for scrolling the displayed contents if all the contents cannot be shown at once within the display area.

An automatic-display-area-enlargement device 1 of FIG. 3 includes a displayed-content updating unit 4, a screen-operation-control unit 5, a display-area-enlargement-control unit 6, a time-measurement unit 7, a display-area-control unit 8, and a control-information-management unit 9.

The displayed-content updating unit 4 includes a displayed-content-update detecting unit 16 for detecting a request for updating displayed contents when the request is issued. Such a request comes from an external source independently of display control such as automatic enlargement and automatic restoration.

The screen-operation-control unit 5 includes a screen-operation detecting unit 10 for detecting a user screen operation such as a shift of a mouse pointer, a mouse click, a drag operation, etc.

The display-area-enlargement-control unit 6 receives data of what is indicated by a screen operation from the screen-operation detecting unit 10 or data of updating contents from the displayed-content-update detecting unit 16. The display-area-enlargement-control unit 6 includes a display-area-enlargement-start/end detecting unit 11. The display-area-enlargement-start/end detecting unit 11 determines whether display enlargement or display restoration is requested based on display-status-control information (A) and display-area-coordinate information (B). Here, the display-status-control information (A) and the display-area-coordinate information (B) are stored in the control-information-management unit 9. Further, the display-area-enlargement-control unit 6 has restoring-display information (C) and displayed-contents screening information (D) stored therein. The restoring-display information (C) indicates whether there is a specified line used for restoring original display.

The time-measurement unit 7 receives a request for counting an automatic restoration time from the display-area-enlargement-start/end detecting unit 11. The time-measurement unit 7 includes a timing unit 12 for measuring time upon receipt of the request, and stores therein specified-time information (F) and current-time information (G). The time-measurement unit 7 is also used for counting passage of a predetermined time period for other purposes.

The display-area-control unit 8 includes a display-area-enlargement-request unit 13, a display-area-restoration-request unit 14, and a display-coordinate-information updating unit 15. The display-area-control unit 8 also stores therein display-area-restoration-control information (E). The display-area-enlargement-request unit 13 receives a request for enlargement from the display-area-enlargement-start/end detecting unit 11, and requests the screen to enlarge a display area. The display-area-restoration-request unit 14 receives a request for restoration from the display-area-enlargement-start/end detecting unit 11, and requests the screen to restore an original display. The display-coordinate-information updating unit 15 updates coordinate information about a display area each time a request for enlargement or a request for restoration is issued. The display-area-restoration-control information (E) indicates display coordinates used at the time of request for display restoration.

FIG. 4 is an illustrative drawing showing a data structure of the display-status-control information.

As shown in FIG. 4, the display-status-control information includes an enlargement flag, which takes a value n that is either 0 or 1. When the value n is 0, this indicates a standard status where a display area has a standard size. When the value n is 1, this indicates an enlarged status where a display area has an enlarged size.

FIG. 5 is an illustrative drawing showing a data structure of the display-area-coordinate information.

As shown in FIG. 5, the display-area-coordinate information includes coordinates of a top left corner, a width (horizontal length), and a height (vertical length) of a current display area.

Figures 6, 7:
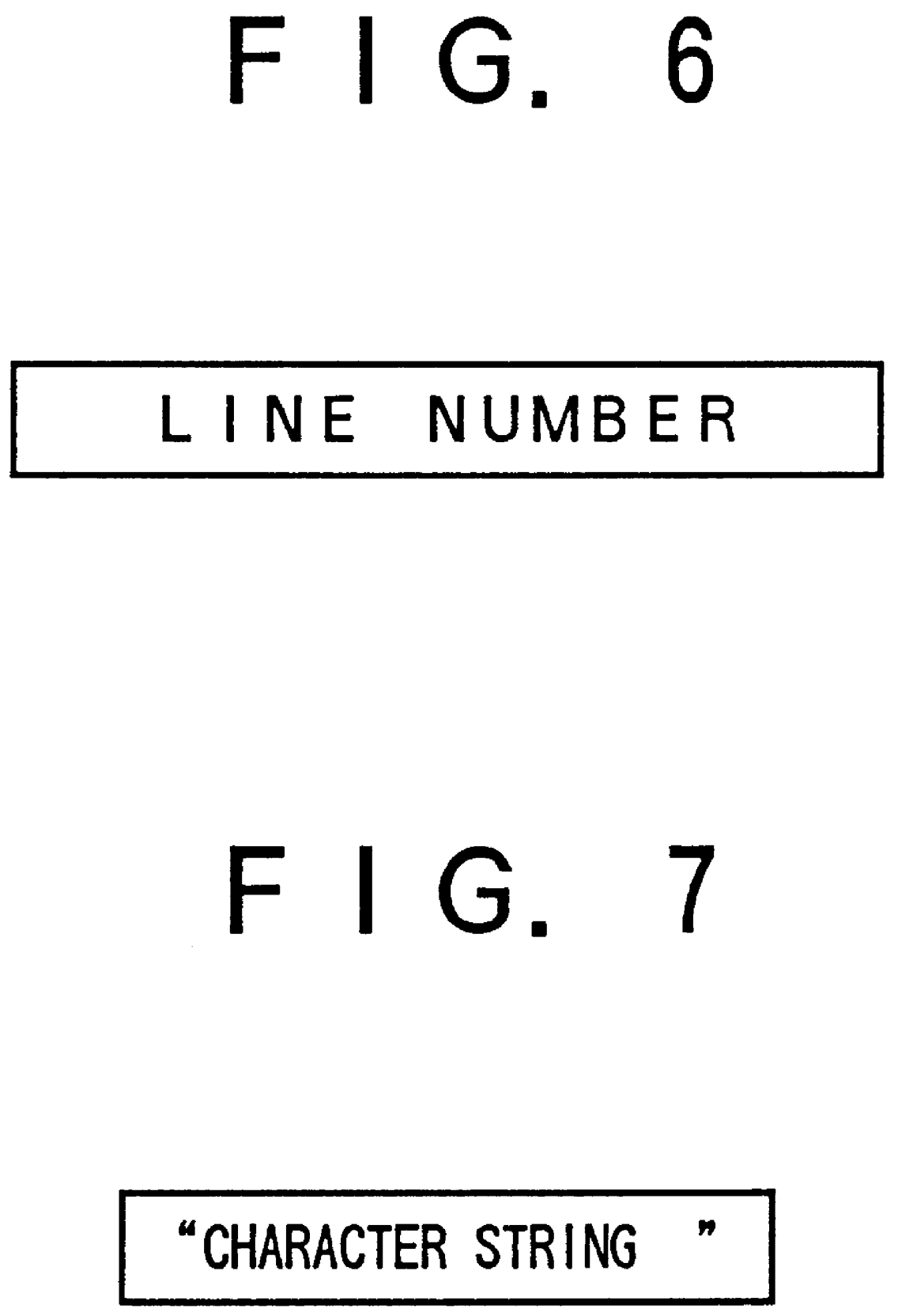

FIG. 6 is an illustrative drawing showing a data structure of the restoring-display information.

As shown in FIG. 6, the restoring-display information includes a line number of a line that is to be displayed at a very top of a restored display area.

FIG. 7 is an illustrative drawing showing a data structure of the displayed-contents screening information.

As shown in FIG. 7, the displayed-contents screening information includes a character string. At a time of a display enlargement, contents to be displayed are screened (filtered) so as to include this character string in a portion that is displayed within the enlarged display area.

FIG. 8 is an illustrative drawing showing a data structure of the display-area-restoration-control information.

As shown in FIG. 8, the display-area-restoration-control information includes coordinates of a top left corner, a width (horizontal length), and a height (vertical length) of an original display area to which an enlarged display area is to be restored.

FIG. 9 is an illustrative drawing showing a data structure of the specified-time information.

As shown in FIG. 9, the specified-time information indicates a time period t1 that should pass before an automatic restoration of an original display area is performed.

FIG. 10 is an illustrative drawing showing a data structure of the current-time information.

As shown in FIG. 10, the current-time information includes a current time tn showing a present moment and a time-counting start time t0 at which counting of time is started.

Operations of the automatic-display-area-enlargement device 1 will be described below with reference to FIG. 3.

Detection of Enlargement Request and Enlargement of Display

In FIG. 3, the screen-operation detecting unit 10 of the screen-operation-control unit 5 detects a user screen operation. Upon detection thereof, the screen-operation detecting unit 10 reports it to the display-area-enlargement-start/end detecting unit 11 of the display-area-enlargement-control unit 6.

The display-area-enlargement-start/end detecting unit 11 finds that the user screen operation is a request for display enlargement based on received data of a mouse-pointer location and the display-area-coordinate information (B) of the control-information-management unit 9.

After detecting the request for display enlargement, the display-area-enlargement-start/end detecting unit 11 checks the display-status-control information (A) of the control-information-management unit 9 to confirm that a current display area is not in an enlarged form. Further, the display-area-enlargement-start/end detecting unit 11 checks whether the displayed-contents screening information (D) is specified. Then, the display-area-enlargement-start/end detecting unit 11 request the display-area-enlargement-request unit 13 to enlarge the display area.

The display-area-enlargement-request unit 13 of the display-area-control unit 8 stores sizes of the display-area frame 21, the display-condition setting area 22, and the content-display area 23 in the display-area-restoration-control information (E). The display-area-enlargement-request unit 13 then uses the display-coordinate-information updating unit 15 to determine an enlarged size of the content-display area 23, and enlarges the display area. The display-area-enlargement-request unit 13 makes a setting to the display-status-control information (A) of the control-information-management unit 9 to indicate an enlarged status. Further, the display-coordinate-information updating unit 15 stores coordinates of the enlarged display area in the display-area-coordinate information (B) of the control-information-management unit 9.

A user screen operation for requesting display enlargement may include a move of the mouse pointer entering a display area. Namely, when the user moves a mouse pointer into the display area, the display-area-enlargement-startlend detecting unit 11 determines whether the mouse is located inside the display area based on received data of a mouse-pointer location and the display-area-coordinate information. If the mouse pointer is positioned inside the display area, the content-display area 23 is enlarged. Here, the display area for triggering the enlargement of the content-display area 23 may be the same as the content-display area 23, or may be the display-area frame 21.

Alternatively, the user screen operation for requesting display enlargement may include a stay of the mouse curser inside a display area for longer than a predetermined time period. When the user moves a mouse pointer into the display area, the display-area-enlargement-start/end detecting unit 11 determines whether the mouse is located inside the display area based on received data of a mouse-pointer location and the display-area-coordinate information. Further, the display-area-enlargement-start/end detecting unit 11 requests the time-measurement unit 7 to check a passage of a predetermined time period. If the mouse pointer stays inside the display area for more than a predetermined time period, the content-display area 23 is enlarged. A condition for triggering the enlargement of mouse pointer may require that the mouse pointer stays still at a location inside the display area, or may require that the mouse pointer stays inside the display area regardless of whether the mouse pointer is in a constant motion or stays still.

Alternatively, the user operation for requesting display enlargement may include a mouse click on a scroll bar. Namely, when the user clicks the scroll bar with the mouse, the display-area-enlargement-start/end detecting unit 11 determines whether the mouse is located inside the scroll-bar area based on received data of a mouse-pointer location and the display-area-coordinate information. If the mouse pointer is positioned inside the scroll-bar area, the content-display area 23 is enlarged.

Alternatively, the user operation for requesting display enlargement may include a mouse click within the display area.

Regardless of what user screen operation is defined as a request for display enlargement, an underlying principle is that a user screen operation without an express request for display enlargement is processed as an implicit request for display enlargement. Namely, a mouse movement into a display area, for example, may indicate the user's intention to operate the display area. To avoid capricious window enlargements as a mouse pointer moves inside the display screen, it may be reasonable to require the mouse pointer to stay inside the display area for more than a predetermined time period before interpreting the mouse movement as the user's intention to operate the display area. Alternatively, a mouse click on a scroll bar may be interpreted as a request for display enlargement.

In this manner, an enlargement request by a user is entered via a simple screen operation, and automatic enlargement of a display area is effected in response to the request. This simplifies user operations necessary for enlargement of display.

Setting of Enlargement Conditions

In FIG. 3, when a user performs a mouse drag operation, the screen-operation detecting unit 10 of the screen-operation-control unit 5 reports this to the display-area-enlargement-start/end detecting unit 11 of the display-area-enlargement-control unit 6.

Based on the reported information, the display-area-enlargement-start/end detecting unit 11 determines whether the mouse drag operation is carried out within the display-condition setting area 22. If it is, the display-area-enlargement-start/end detecting unit 11 stores a dragged character string in the displayed-contents screening information (D).

If the displayed-content-update detecting unit 16 of the displayed-content updating unit 4 detects a request for display update when a request for display enlargement is made, the display-area-enlargement-start/end detecting unit 11 of the display-area-enlargement-control unit 6 is informed of display update information.

The display-area-enlargement-start/end detecting unit 11 checks whether the received display-update information matches the displayed-contents screening information (D). If a match is found, the display-area-enlargement-start/end detecting unit 11 requests the display-area-enlargement-request unit 13 of the display-area-control unit 8 to enlarge a display area.

In this manner, when the user-specified screening information is included in contents to be displayed, an automatic display enlargement is triggered upon displaying of the contents. This simplifies a user screen operation.

Display Enlargement Based On Settings

In FIG. 3, when a user performs a mouse drag operation, the screen-operation detecting unit 10 of the screen-operation-control unit 5 reports this to the display-area-enlargement-start/end detecting unit 11 of the display-area-enlargement-control unit 6.

Based on the reported information, the display-area-enlargement-start/end detecting unit 11 determines whether the mouse drag operation is carried out within the display-condition setting area 22. If it is, the display-area-enlargement-start/end detecting unit 11 stores a dragged character string in the displayed-contents screening information (D).

When a request for display enlargement is made, the display-area-enlargement-start/end detecting unit 11 checks whether the displayed-contents screening information (D) includes a character string. If it does, the display-area-enlargement-start/end detecting unit 11 sends the character string to the display-area-enlargement-request unit 13 of the display-area-control unit 8. The display-area-enlargement-request unit 13 filters contents to be displayed based on the character string, and displays the filtered contents on an enlarged display area.

In this manner, only the filtered contents containing the user-specified screening information are displayed in an enlarged form.

Setting of Restoration Condition

In FIG. 3, when a user moves a mouse pointer out of the display-area frame 21, the screen-operation detecting unit 10 of the screen-operation-control unit detects details of the user screen operation, and reports them to the display-area-enlargement-start/end detecting unit 11 of the display-area-enlargement-control unit 6.

Based on the received mouse-pointer positions and the display-area-coordinate information (B) of the control-information-management unit 9, the display-area-enlargement-start/end detecting unit 11 ascertains that the mouse curser has moved out of the display-area frame 21, and interprets this operation as a request for display restoration.

After detecting the request for display restoration, the display-area-enlargement-start/end detecting unit 11 checks the display-status-control information (A) of the controlinformation-management unit 9 to confirm that a current display status is an enlarged status. Then, the display-area-enlargement-start/end detecting unit 11 obtains a line to be displayed at the time of restoration by referring to the restoring-display information (C). The display-area-enlargement-start/end detecting unit 11 further requests the display-area-restoration-request unit 14 of the display-area-control unit 8 to restore the display area.

The display-area-restoration-request unit 14 of the display-area-control unit 8 consults the display-area-restoration-control information (E) and the line to be displayed at the time of restoration so as to determine the size of a restored display area. After this, the display-area-restoration-request unit 14 restores the display area, and sets the display-status-control information (A) of the control-information-management unit 9 to a standard status.

Further, the display-area-restoration-request unit 14 requests the display-coordinate-information updating unit 15 to set standard information in the display-area-coordinate information (B) of the control-information-management unit 9.

The display-coordinate-information updating unit 15 consults the display-area-restoration-control information (E), and stores appropriate information in the display-area-coordinate information (B) of the control-information-management unit 9.

In this manner, a user request for display restoration is automatically detected, and an original display is automatically restored.

Automatic Restoration Responding to Period of No Operation

In FIG. 3, the screen-operation detecting unit 10 of the screen-operation-control unit 5 monitors a position of a user-controlled mouse pointer in the display-area frame 21, and reports mouse-pointer positions to the display-area-enlargement-start/end detecting unit 11 of the display-area-enlargement-control unit 6.

Based on the received mouse-pointer positions and the display-area-coordinate information (B) of the control-information-management unit 9, the display-area-enlargement-start/end detecting unit 11 finds that the mouse curser remains still inside the display-area frame 21, and determines that no user operation is being performed.

As no user operation is detected, the display-area-enlargement-start/end detecting unit 11 checks the display-status-control information (A) of the control-information-management unit 9 to confirm that the display area is currently in an enlarged form. Then, the display-area-enlargement-start/end detecting unit 11 requests the timing unit 12 of the time-measurement unit 7 to start measuring time.

The timing unit 12 of the time-measurement unit 7 sores a specified time in the specified-time information (F), and starts checking time by using the current-time information (G) which indicates a present time. When detecting an arrival of the specified time, the timing unit 12 informs the display-area-enlargement-start/end detecting unit 11 of this fact.

Being informed, the display-area-enlargement-start/end detecting unit 11 of the display-area-enlargement-control unit 6 refers to the display-status-control information (A) of the control-information-management unit 9 to check that the current display status indicates an enlarged status. Thereafter, the display-area-enlargement-start/end detecting unit 11 obtains a line to be displayed at the time of restoration by referring to the restoring-display information (C). The display-area-enlargement-start/end detecting unit 11 further requests the display-area-restoration-request unit 14 of the display-area-control unit 8 to restore the display area.

The display-area-restoration-request unit 14 of the display-area-control unit 8 consults the display-area-restoration-control information (E) and the line to be displayed at the time of restoration so as to determine the size of a restored display area. After this, the display-area-restoration-request unit 14 restores the display area, and sets the display-status-control information (A) of the control-information-management unit 9 to a standard status. Further, the display-area-restoration-request unit 14 requests the display-coordinate-information updating unit 15 to set standard information in the display-area-coordinate information (B) of the control-information-management unit 9.

The display-coordinate-information updating unit 15 consults the display-area-restoration-control information (E), and stores appropriate information in the display-area-coordinate information (B) of the control-information-management unit 9.

In this manner, stoppage of user operations is automatically detected, and the original display area is automatically restored after a passage of a predetermined time period.

Setting of Line to be Restored

In FIG. 3, when a user performs a mouse click, the screen-operation detecting unit 10 of the screen-operation-control unit 5 report it to the display-area-enlargement-start/end detecting unit 11 of the display-area-enlargement-control unit 6.

Based on the received mouse-click information, the display-area-enlargement-start/end detecting unit 11 determines whether the mouse click is made on the scroll bar 24 of the content-display area 23. If it is, the display-area-enlargement-start/end detecting unit 11 stores information about the currently displayed content-display area in the restoring-display information (C) upon a completion of the scroll-bar operation.

In this case, an original display area can be restored from an enlarged form by referring to the restoring-display information (C). This makes it possible to display lines as they were displayed immediately before an enlargement of a display area.

Displaying Lines Starting from Selected Line

In FIG. 3, when a user performs a mouse drag operation, the screen-operation detecting unit 10 of the screen-operation-control unit 5 report it to the display-area-enlargement-start/end detecting unit 11 of the display-area-enlargement-control unit 6.

Based on the received mouse-drag information, the display-area-enlargement-start/end detecting unit 11 ascertains that the mouse drag operation is carried out within the content-display area 23. The display-area-enlargement-start/end detecting unit 11 then stores information in the restoring-display information (C) such that the stored information indicates the dragged line as a start line to be displayed.

In this case, an original display area can be restored from an enlarged form by referring to the restoring-display information (C). This makes it possible to display lines by starting from the user-specified line.

In the following, embodiments of the present invention will be described with reference to FIG. 3.

In what follows, a mouse-click on the scroll bar is used as an example of a user screen operation that implicitly requests display enlargement. It should be noted that the mouse-click operation on the scroll bar can be simply replaced by a move of the mouse pointer into a display area or by a stay of the mouse pointer inside the display area for more than a predetermined time period. Software programmers having ordinary skill should be able to easily make such alterations once instructions are given with regard to the changes.

Detection of Enlargement Request and Enlargement of Display

The display terminal 20 shows the screen A which includes the display-area frame 21, the display-condition setting area 22, the content-display area 23, and the scroll bar 24. The screen A is one of multi-screens.

When a mouse pointer of the display terminal 20 is moved to the scroll bar 24, and a left button of the mouse is clicked on the scroll bar 24, the automatic-display-area-enlargement device 1 automatically detects the mouse click, and enlarges the content-display area 23 to fully cover the interior of the display-area frame. Such detection of an enlargement request and enlargement of a display area will be described below.

Figure 11:
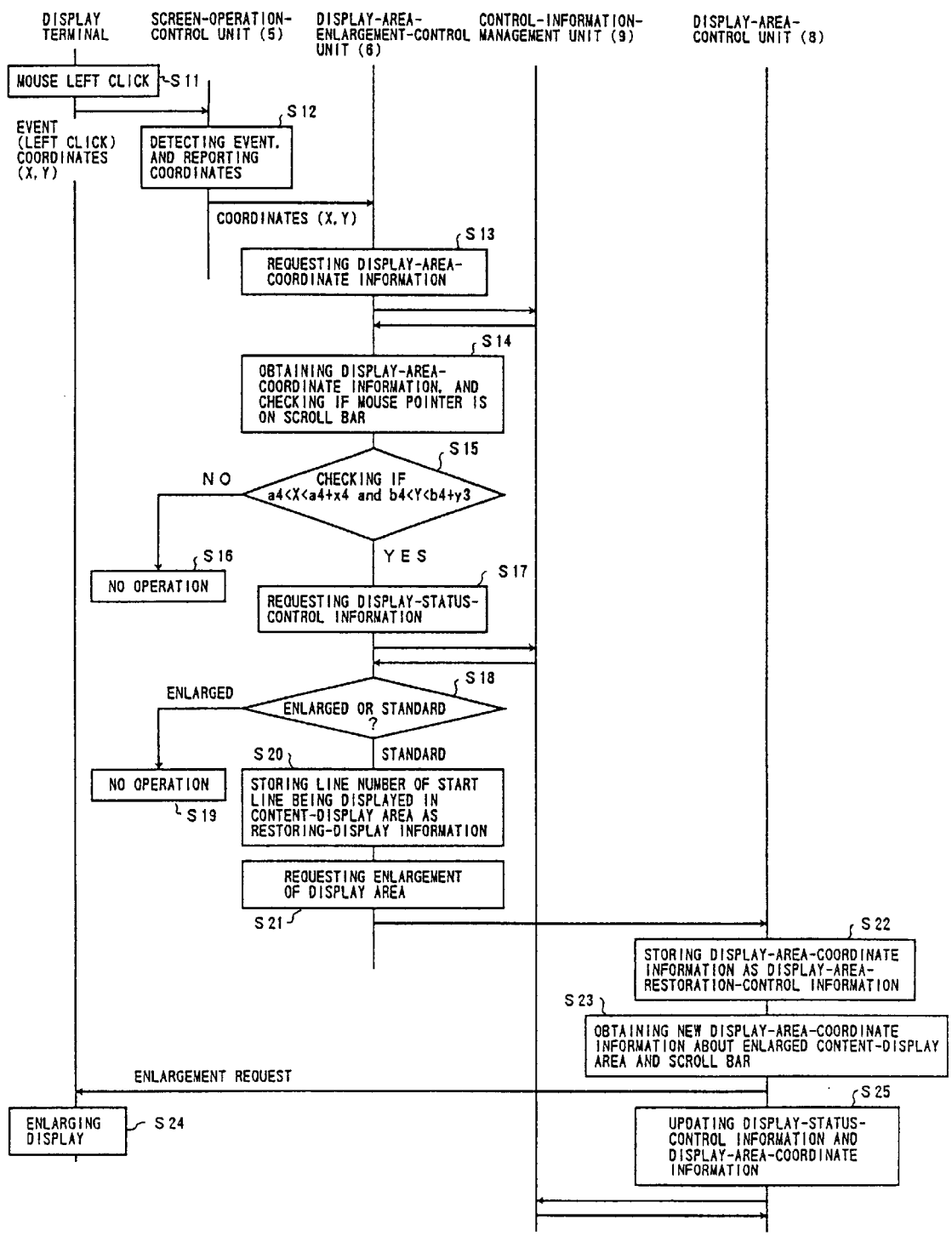
FIG. 11 is a sequence chart showing a process of detecting an enlargement request and enlarging a display area.
Figure 12:
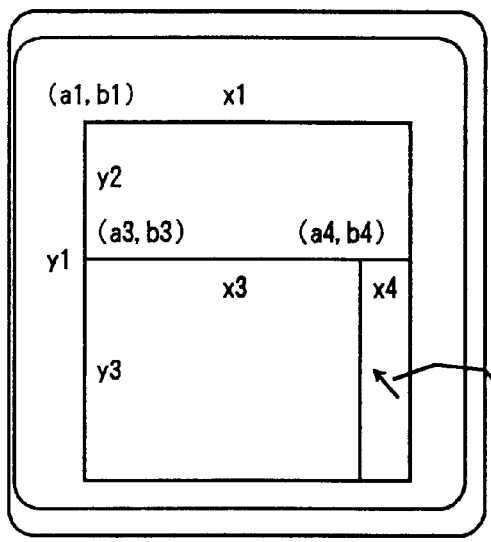
FIG. 12 is an illustrative drawing showing display-status-control information and display-area-coordinate information during a standard-status period.
Figure 13:
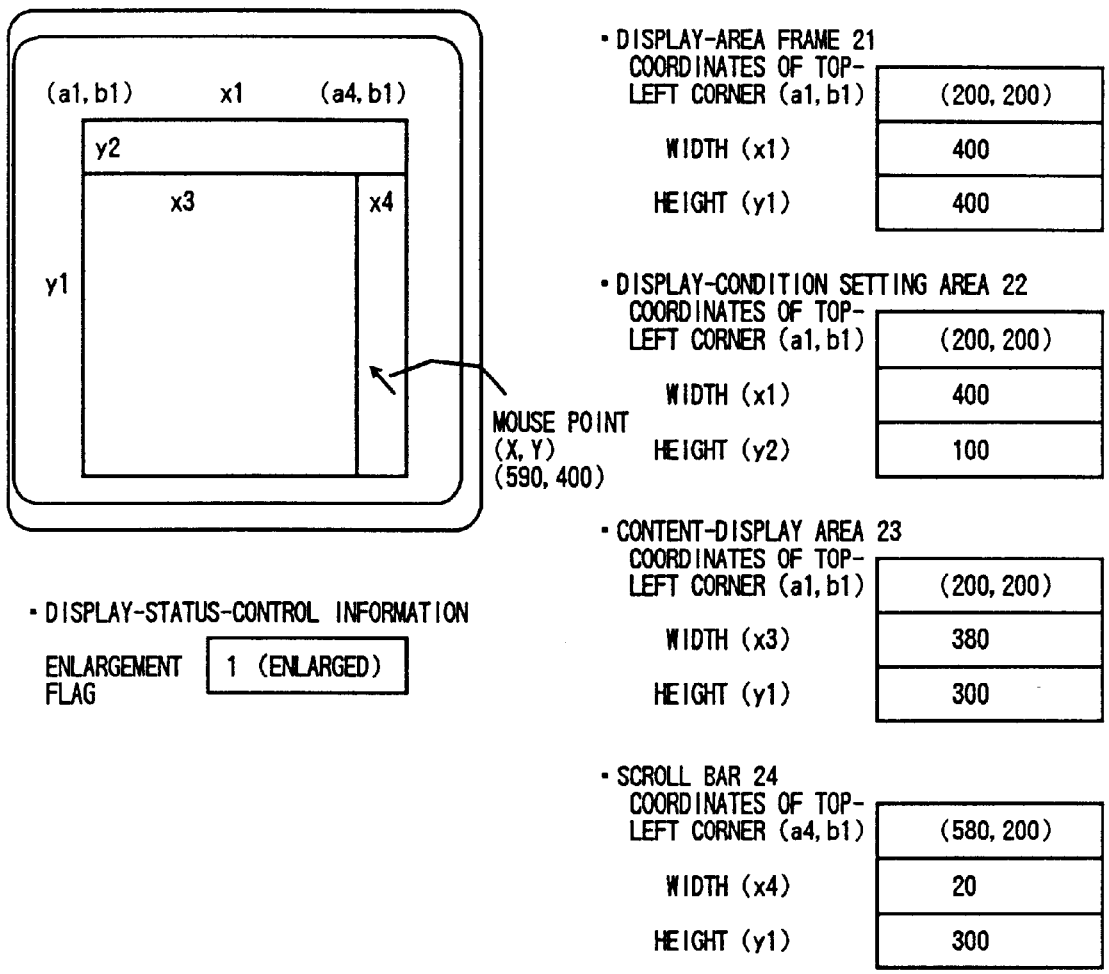
FIG. 13 is an illustrative drawing showing display-status-control information and display-area-coordinate information during an enlarged-status period.

FIG. 11 is a sequence chart showing a process of detecting an enlargement request and enlarging a display area. FIG. 12 is an illustrative drawing showing display-status-control information and display-area-coordinate information during a standard-status period (i.e., not enlarged). FIG. 13 is an illustrative drawing showing display-status-control information and display-area-coordinate information during an enlarged-status period.

As shown in FIG. 12, the display-area-coordinate information includes data of the display-area frame 21 as top-left-corner coordinates (a1, b1), a width (x1), and a height (y1). Data of the display-condition setting area 22 is comprised of top-left-corner coordinates (a1, b1), a width (x1), and a height (y2). Data of the content-display area 23 includes top-left-corner coordinates (a3, b3), a width (x3), and a height (y3). Further, data of the scroll bar 24 is top-left-corner coordinates (a4, b4), a width (x4), and a height (y3). Here, the display is in a standard status.

When a user performs a mouse-left-button click at a point (X, Y) on the scroll bar 24 as shown in FIG. 12 (step S11 of FIG. 11), the screen-operation detecting unit 10 of the screen-operation-control unit 5 detects the click operation (event:leftclick). The screen-operation-control unit 5 reports the click-point coordinates (X, Y) to the display-area-enlargement-start/end detecting unit 11 of the display-area-enlargement-control unit 6 (step S12).

The display-area-enlargement-start/end detecting unit 11 of the display-area-enlargement-control unit 6 obtains the display-area-coordinate information from the control-information-management unit 9 (step S13).

A check is made based on the display-area-coordinate information (a4, b4, x4, y3) about the scroll bar 24 as to whether the mouse pointer is located within an area of the scroll bar 24 (step S14). The check uses the following conditions (step S15).

a4<X<a4+x4 and b4<Y<b4+y3

When these conditions are satisfied, it is ascertained that the mouse pointer is within the scroll bar.

When the mouse pointer is within the scroll bar, the display-area-enlargement-start/end detecting unit 11 of the display-area-enlargement-control unit 6 obtains the display-status-control information (A) from the control-information-management unit 9 (step S17). If the display-status-control information (A) includes an enlargement flag indicative of a standard status (step S18), the display-area-enlargement-start/end detecting unit 11 of the display-area-enlargement-control unit 6 ascertains that the mouse click is a request for enlarging the screen A. The display-area-enlargement-start/end detecting unit 11 stores as the restoring-display information (C) a line number of a start line being displayed in the content-display area 23 (step S20), and, then, requests the display-area-enlargement-request unit 13 of the display-area-control unit 8 to enlarge the display area (step S21).

The display-area-enlargement-request unit 13 of the display-area-control unit 8 obtains the display-area-coordinate information from the control-information-management unit 9, and stores it as display-area-restoration-control information (step S22).

The display-coordinate-information updating unit 15 of the display-area-control unit 8 obtains the display-area-coordinate information (a1, b1, x3, y1) about the enlarged content-display area 23 based on the display-area-coordinate information (a1, b1, x1, y1) about the display-area frame 21 and the display-area-coordinate information (a4, b4, x4, y3) about the scroll bar 24 (step S23, see FIG. 13). In detail, the coordinates and size of the enlarged content-display area 23 are determined by using the top-left-corner coordinates (a1, b1) and the height (y1) of the display-area frame 21.

The display-area-coordinate information (a1, b1, x3, y1) is sent to the display terminal 20 to have the content-display area 23 enlarged (step S24).

The display-coordinate-information updating unit 15 of the display-area-control unit 8 updates the display-status-control information (A) of the control-information-management unit 9 such that the enlargement flag indicates an enlarged status (step S25).

Setting of Enlargement Conditions and Enlargement of Display

Figure 14A:
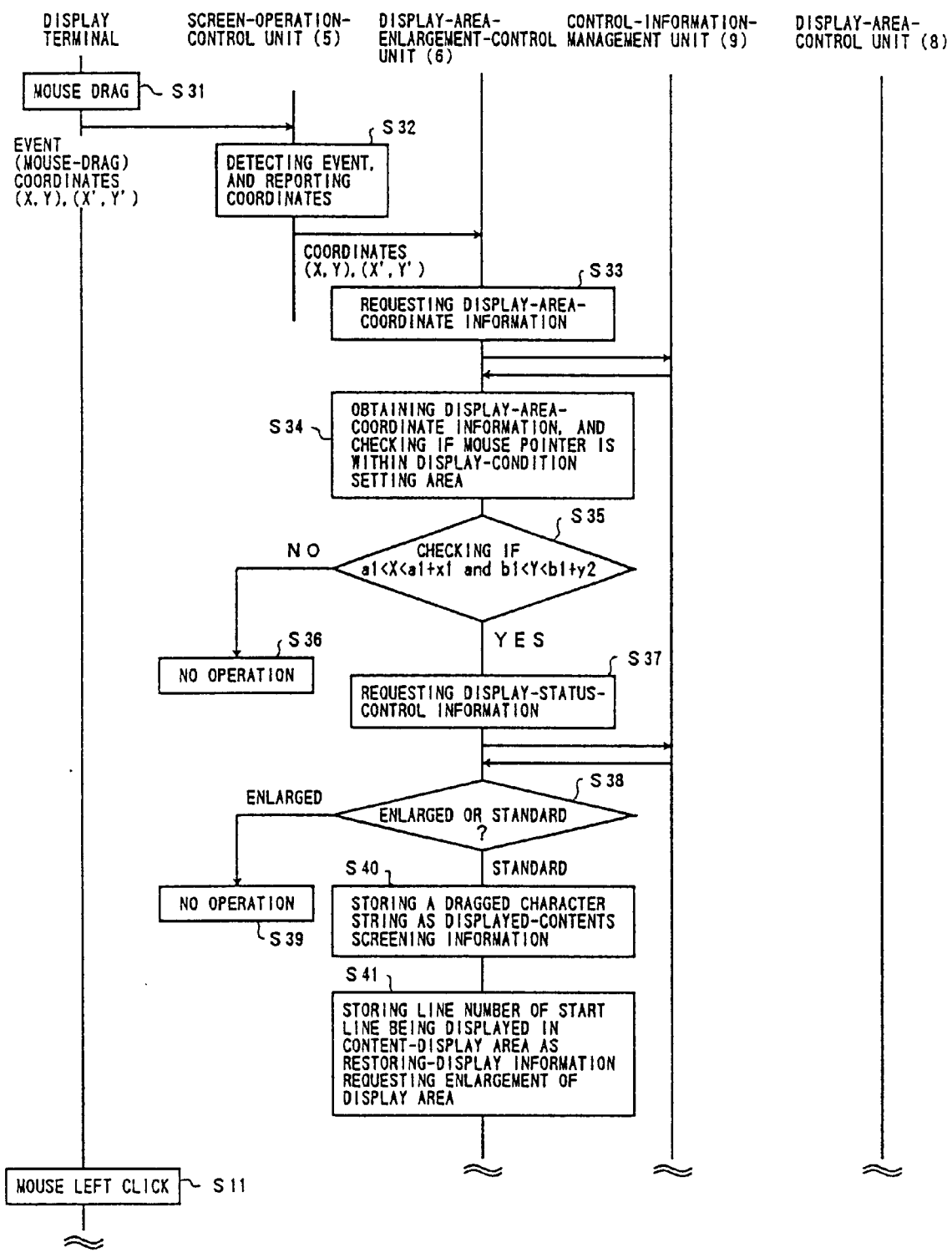
FIGS. 14A and 14B are sequence charts showing a process of setting enlargement conditions and enlarging display.
Figure 14B:
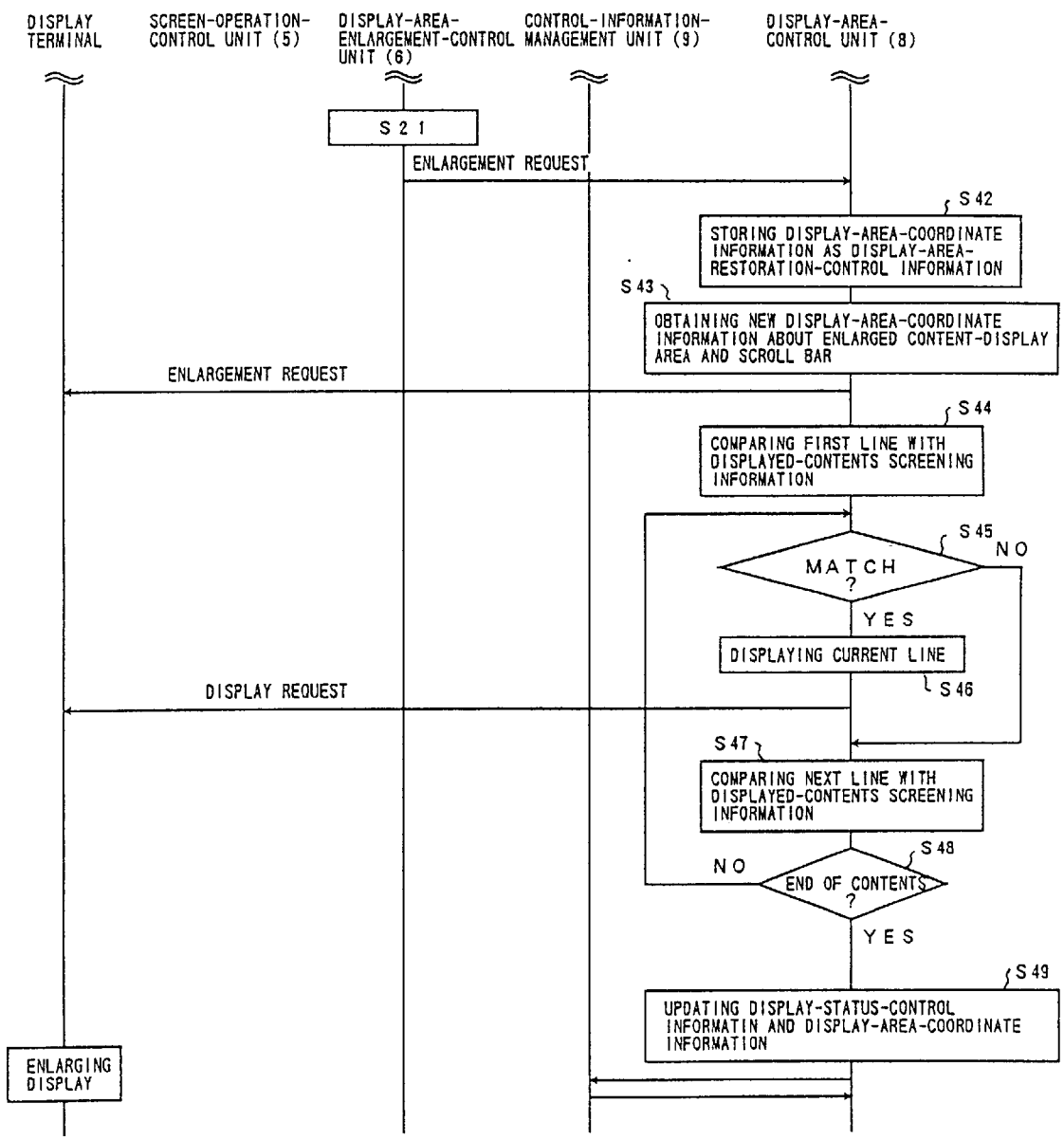
Figure 16:
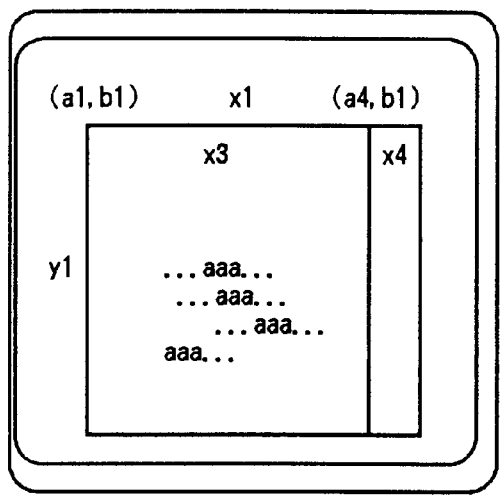
FIG. 16 is an illustrative drawing showing display-status-control information, display-area-coordinate information, and displayed-contents screening information during an enlarged-status period.

FIGS. 14A and 14B are sequence charts showing a process of setting enlargement conditions and enlarging display. FIG. 15 is an illustrative drawing showing display-status-control information, display-area-coordinate information, and displayed-contents screening information during a standard-status period. FIG. 16 is an illustrative drawing showing display-status-control information, display-area-coordinate information, and displayed-contents screening information during an enlarged-status period.

A drag operation of a mouse pointer is performed within the display-condition setting area 22 so as to select conditions used for displaying contents on the content-display area. Further, contents are displayed after restoration of an original display area in accordance with specified conditions. This process will be described below.

As shown in FIG. 15, the display-area-coordinate information includes data of the display-area frame 21 as top-left-corner coordinates (a1, b1), a width (x1), and a height (y1). Data of the display-condition setting area 22 is comprised of top-left-corner coordinates (a1, b1), a width (x1), and a height (y2). Data of the content-display area 23 includes top-left-corner coordinates (a3, b3), a width (x3), and a height (y3). Further, data of the scroll bar 24 is top-left-corner coordinates (a4, b4), a width (x4), and a height (y3). Here, the display is in a standard status.

When a user drags a mouse pointer from a point (X, Y) to a point (X', Y') in the display-condition setting area 22 as shown in FIG. 15 (step S31 of FIG. 14A), the screen-operation detecting unit 10 of the screen-operation-control unit 5 detects the drag operation (event:drag). The screen-operation-control unit 5 reports the drag-operation coordinates (X, Y) and (X', Y') to the display-area-enlargement-start/end detecting unit 11 of the display-area-enlargement-control unit 6 (step S32).

The display-area-enlargement-start/end detecting unit 11 of the display-area-enlargement-control unit 6 obtains the display-area-coordinate information from the control-information-management nit 9 (step S33).

A check is made based on the display-area-coordinate information (a1, b1, x1, y2) about the splay-condition setting area 22 as to whether the mouse pointer is located within the display-condition setting area 22 (step S34). The check uses the following conditions (step S35).

a1<X<a1+x1 and b1<Y<b1+y2

When these conditions are satisfied, it is ascertained that the drag operation was performed inside the display-condition setting area.

When the drag operation took place inside the display-condition setting area, the display-area-enlargement-start/end detecting unit 11 of the display-area-enlargement-control unit 6 obtains the display-status-control information from the control-information-management unit 9 (step S37). If the display-status-control information includes an enlargement flag indicative of a standard status (step S38), the display-area-enlargement-start/end detecting unit 11 of the display-area-enlargement-control unit 6 ascertains that the mouse-drag operation is a request for specifying conditions for displaying contents in the screen A.

Based on the coordinates of the drag-start point (X, Y) and the drag-end point (X', Y') and the coordinates of the display-condition setting area, the display-area-enlargement-start/end detecting unit 11 identifies a character string "aaa" as being specified by the mouse-drag operation, and stores it as the displayed-contents screening information (D) (step S40). The display-area-enlargement-start/end detecting unit 11 further stores as the restoring-display information (C) a line number of a start line being displayed in the content-display area 23 (step S41).

Thereafter, a user performs a mouse-left-button click at a point (X, Y) on the scroll bar 24 (step S11 of FIG. 14A), the screen-operation detecting unit 10 of the screen-operation-control unit 5 detects the click operation (event:leftclick). The screen-operation-control unit 5 reports the click-point coordinates (X, Y) to the display-area-enlargement-start/end detecting unit 11 of the display-area-enlargement-control unit 6 (step S12). Here, operations from the step S12 to the step S20, which will be described below, are omitted from FIGS. 14A and 14B since they are the same as those of FIG. 11.

The display-area-enlargement-start/end detecting unit 11 of the display-area-enlargement-control unit 6 obtains the display-area-coordinate information from the control-information-management unit 9 (step S13).

A check is made based on the display-area-coordinate information (a4, b4, x4, y3) about the scroll bar 24 as to whether the mouse pointer is located within an area of the scroll bar 24 (step S14). The check uses the following conditions (step S15).

a4<X<a4+x4 and b4<Y<b4+y3

When these conditions are satisfied, it is ascertained that the mouse pointer is within the scroll bar.

When the mouse pointer is within the scroll bar, the display-area-enlargement-start/end detecting unit 11 of the display-area-enlargement-control unit 6 obtains the display-status-control information (A) from the control-information-management unit 9 (step S17). If the display-status-control information (A) includes an enlargement flag indicative of a standard status (step S18), the display-area-enlargement-start/end detecting unit 11 of the display-area-enlargement-control unit 6 ascertains that the mouse click is a request for enlarging the screen A. The display-area-enlargement-start/end detecting unit 11 stores as the restoring-display information (C) a line number of a start line being displayed in the content-display area 23 (step 520), and, then, requests the display-area-enlargement-request unit 13 of the display-area-control unit 8 to enlarge the display area (step S21). Further, display-area-enlargement-start/end detecting unit 11 checks if the displayed-contents screening information (D) indicates any conditions. If it does, indicated conditions are reported to the display-area-control unit 8.

The display-area-control unit 8 obtains the display-area-coordinate information (B) from the control-information-management unit 9, and stores it as the display-area-restoration-control information (E) (step S42). Also, the display-area-control unit 8 changes the display-area frame (S43)

When the displayed-contents screening information (D) has conditions set therein, the following procedure will be carried out in order to filter displayed contents.

As shown in FIG. 14B, the display-area-control unit 8 compares the displayed-contents screening information (D) with each line of all the contents of what is displayed in the content-display area 23 (step S44). The comparison is made one line after another by starting from the first line.

As shown in FIG. 15, if a given line includes the character string "aaa", this line is displayed on the display terminal 20 as the contents to be displayed.

In this manner, only those lines which includes the character string "aaa" are displayed in the content-display area 23 as shown in FIG. 16.

Restoration upon Mouse Click outside the Frame

When the content-display area 23 is in its enlarged form, a mouse-left-button click outside the display-area frame 21 triggers restoration of the content-display area 23 to its original form. Alternatively, a move of the mouse pointer exiting from the display-area frame 21 may trigger restoration of the content-display area 23. This operation will be described below.

Figure 17:
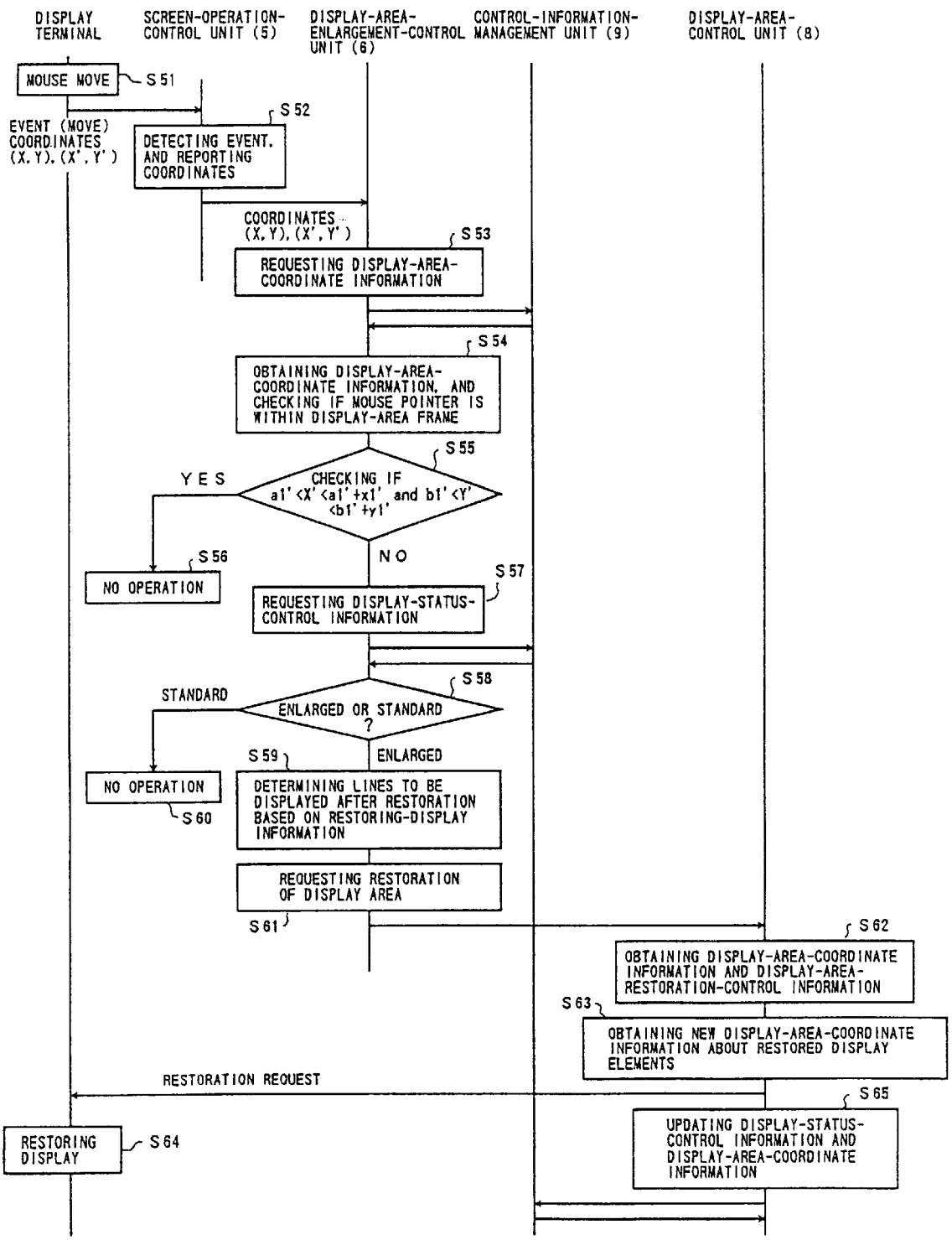
FIG. 17 is a sequence chart showing a process of restoring a display area in response to a move of a mouse pointer exiting from the display-area frame.

FIG. 17 is a sequence chart showing a process of restoring a display area in response to a move of a mouse pointer exiting from the display-area frame. FIG. 18 is an illustrative drawing showing display-status-control information and display-area-coordinate information during a enlarged-status period. FIG. 19 is an illustrative drawing showing display-status-control information and display-area-coordinate information during a standard-status period as well as a conversion formulae used for display restoration.

As shown in FIG. 18, the display-area-coordinate information includes data of the display-area frame 21 as top-left-corner coordinates (a1', b1'), a width (x1'), and a height (y1'). Data of the display-condition setting area 22 is comprised of top-left-corner coordinates (a1', b1'), a width (x1'), and a height (y2'). Data of the content-display area 23 includes top-left-corner coordinates (a1', b1'), a width (x3'), and a height (y3)'. Further, data of the scroll bar 24 is top-left-corner coordinates (a4', b1'), a width (x4'), and a height (y3'). Here, the display is in an enlarged status.

When a user moves a mouse pointer to a point (X1', Y') out of the display-area frame 21 as shown in FIG. 18 (step S51 of FIG. 17), the screen-operation detecting unit 10 of the screen-operation-control unit 5 detects this user operation (event:move). The screen-operation-control unit 5 reports the mouse-pointer coordinates (X', Y') to the display-area-enlargement-start/end detecting unit 11 of the display-area-enlargement-control unit 6 (step S52).

The display-area-enlargement-start/end detecting unit 11 of the display-area-enlargement-control unit 6 obtains the display-area-coordinate information from the control-information-management unit 9 (step S53). Based on the display-area-coordinate information (a1', b1', x1', y1') about the display-area frame 21, a check is made as to whether the mouse pointer is located within the display-area frame 21 (step S54). The check uses the following conditions (step S55).

a1'<X'<a1'+x1' and b1'<Y'<b1'+y1'

When these conditions are satisfied, it is ascertained that the mouse pointer is located within the display-area frame 21.

When the mouse pointer is positioned outside the display-area frame, the display-area-enlargement-start/end detecting unit 11 of the display-area-enlargement-control unit 6 obtains the display-status-control information from the control-information-management unit 9 (step S57). If the display-status-control information includes an enlargement flag indicative of an enlarged status (step S58), the display-area-enlargement-start/end detecting unit 11 of the display-area-enlargement-control unit 6 ascertains that the user mouse operation is a request for restoring the screen A. The display-area-enlargement-start/end detecting unit 11 obtains from the restoring-display information (C) lines to be displayed after restoration of a display area (step S59), and requests the display-area-restoration-request unit 14 of the display-area-control unit 8 to attend to restoration (step S61).

The display-area-restoration-request unit 14 of the display-area-control unit 8 obtains the display-area-restoration-control information (E), and, also, obtains the display-area-coordinate information (B) from the control-information-management unit 9 (step S62).

Based on the display-area-restoration-control information (a1, b1, x1, y1), (a1, b1, x1, y2), (a3, b3, x3, y3), and (a4, b4, x4, y3) (see FIG. 12) and the display-area-coordinate information (a1', b1', x1', y1'), (a1', b1', x3', y1'), and (a4', b1', x4', y1') (see FIG. 18), the display-coordinate-information updating unit 15 of the display-area-control unit 8 obtains coordinates of display areas that are what they should appear to be after restoration of the content-display area 23 (step S63).

The obtained coordinate information (a1, b1, x1, y1), (a1, b1, x1, y2), (a3, b3, x3, y3), and (a4, b4, x4, y3) is sent to the display terminal 20 to restore the content-display area 23 of the screen A (step S64).

The display-coordinate-information updating unit 15 of the display-area-control unit 8 updates the display-status-control information of the control-information-management unit 9 such that the enlargement flag indicates a standard status (step S65). Further, the display-coordinate-information updating unit 15 updates the display-area-coordinate information (B) to reflect the restored status (step S65).

Automatic Restoration Responding to Period of No Operation

Where the content-display area 23 is enlarged, automatic restoration of the content-display area 23 is triggered if a mouse pointer of the display terminal 20 stays still for more than a predetermined time period. This operation will be described below.

Figure 20A:
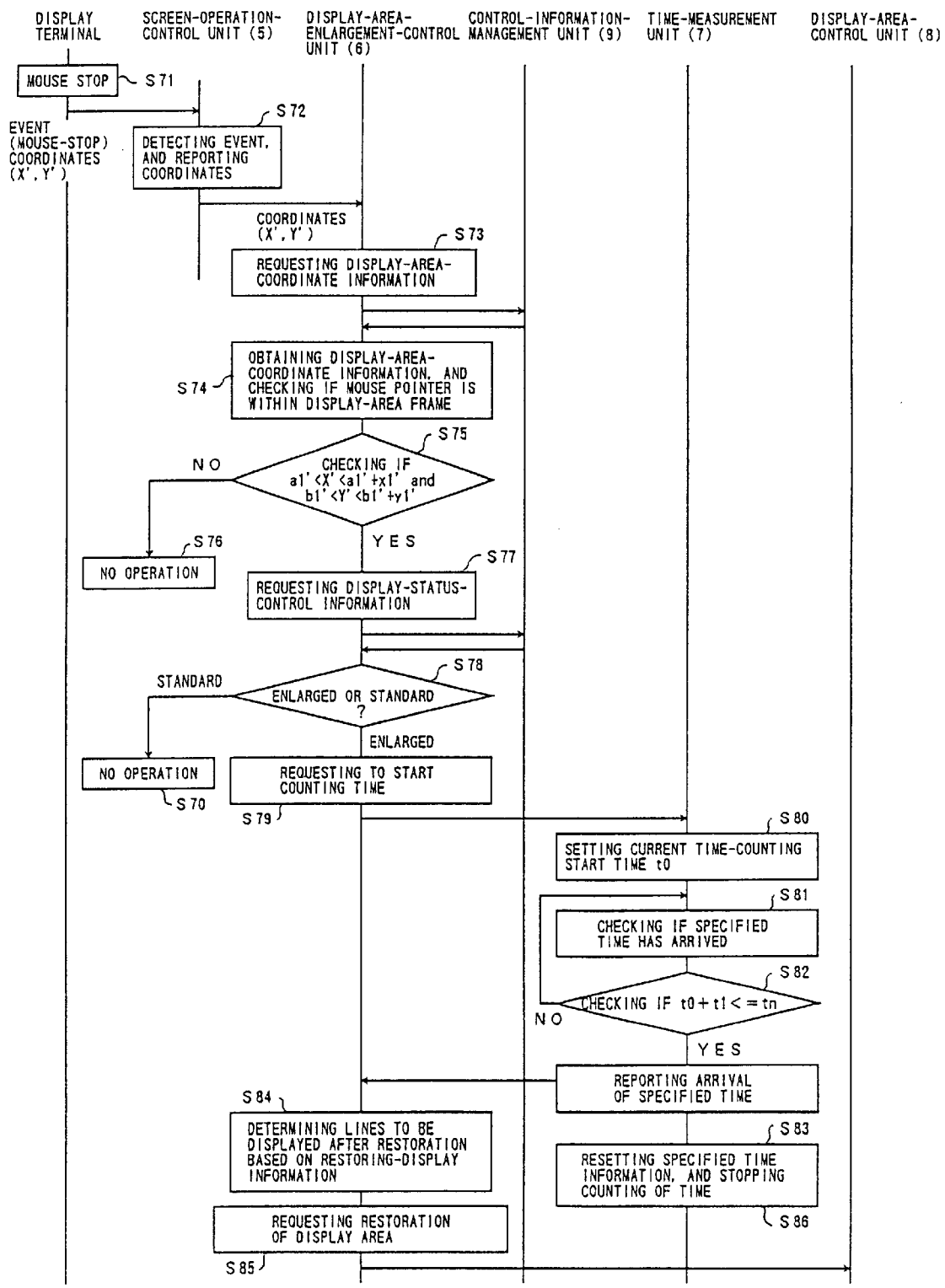
FIGS. 20A and 20B are a sequence chart showing a process of restoring a display area in response to a a period of no operations.
Figure 20B:
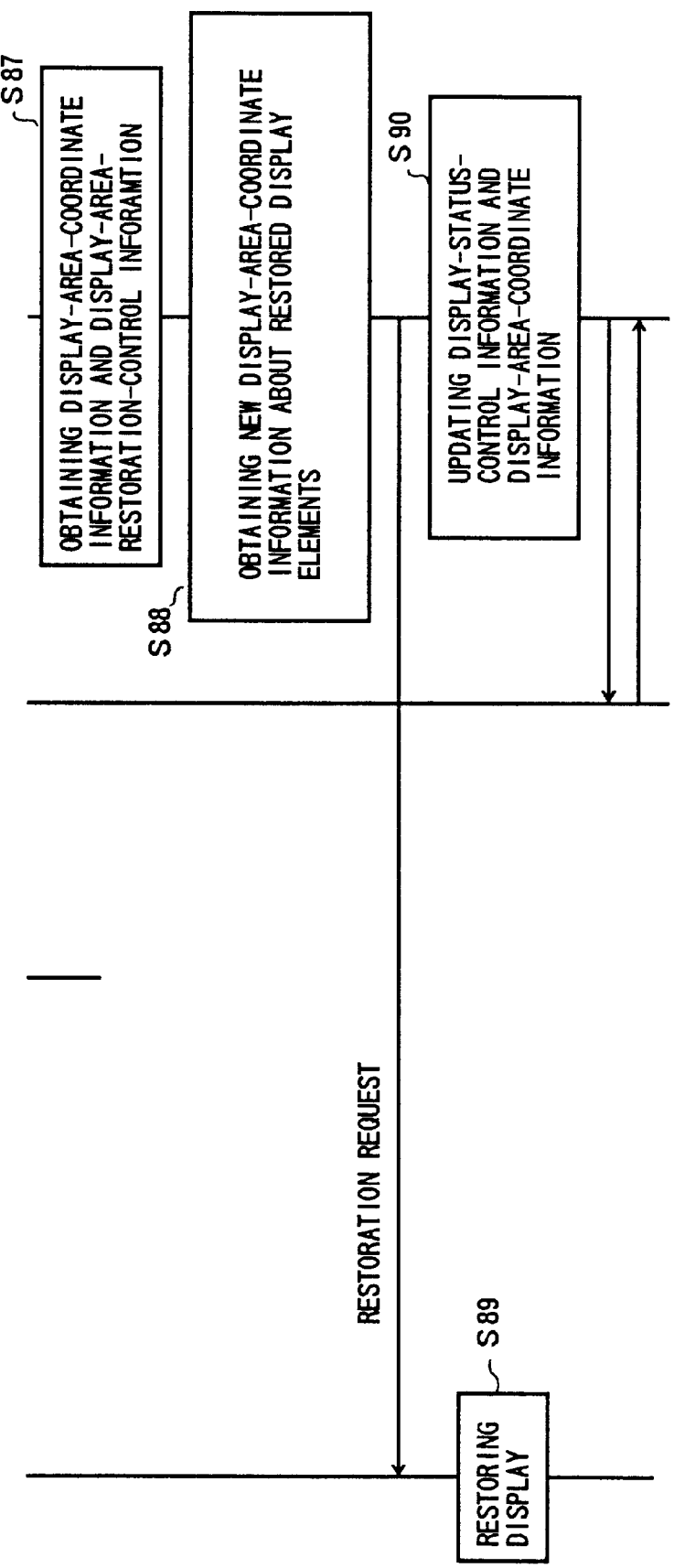
Figures 21A, 21B, 21C:
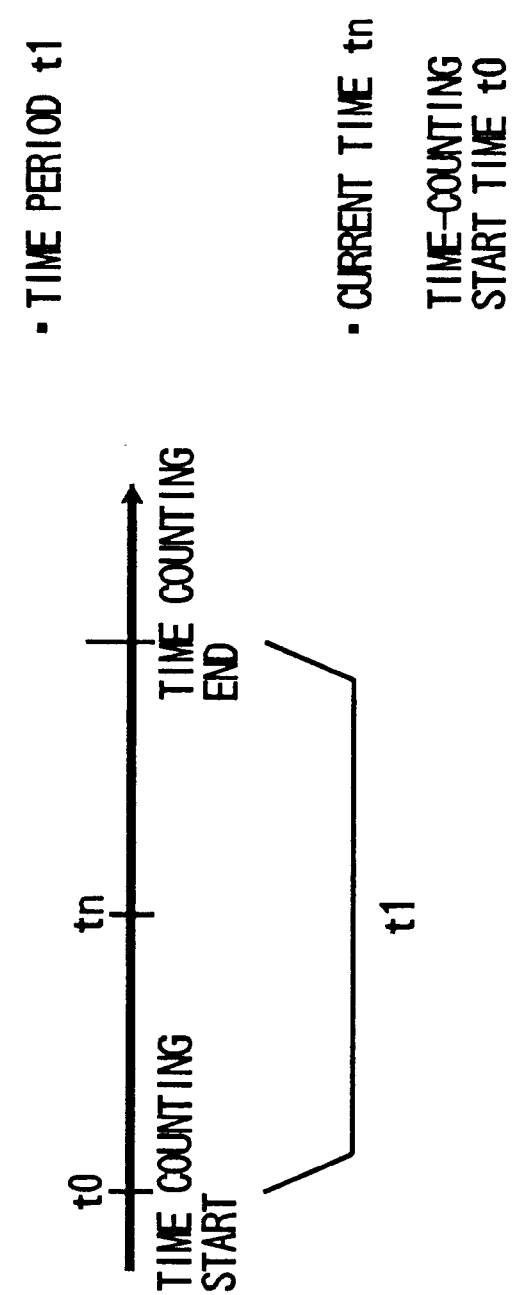
FIGS. 21A through 21C are illustrative drawings for explaining how to measure a passage of a specified period.

FIGS. 20A and 20B are a sequence chart showing a process of restoring a display area in response to a a period of no operations. FIGS. 21A through 21C are illustrative drawings for explaining how to measure a passage of a specified period.

As shown in FIG. 18, the display-area-coordinate information includes data of the display-area frame 21 as top-left-corner coordinates (a1', b1'), a width (x1'), and a height (y1'). Data of the display-condition setting area 22 is comprised of top-left-corner coordinates (a1', b1'), a width (x1'), and a height (y2'). Data of the content-display area 23 includes top-left-corner coordinates (a1', b1'), a width (x3'), and a height (y3)'. Further, data of the scroll bar 24 is top-left-corner coordinates (a4', b1'), a width (x4'), and a height (y3'). Here, the display is in an enlarged status.

When a user stops using a mouse (step S71), the screen-operation detecting unit 10 of the screen-operation-control unit 5 detects this user operation (event:mousestop), and reports mouse-stop coordinates (X', Y') to the display-area-enlargement-start/end detecting unit 11 of the display-area-enlargement-control unit 6 (step S72). The display-area-enlargement-start/end detecting unit 11 of the display-area-enlargement-control unit 6 obtains the display-area-coordinate information (i.e., information shown in FIG. 18) from the control-information-management unit 9 (step S73). Based on the display-area-coordinate information (a1', b1', x1', y1') about the display-area frame 21, a check is made as to whether the mouse pointer is located within the display-area frame 21 (step S74). The check uses the following conditions (step S75).

a1'<X'<a1'+x1' and b1'<Y'<b1'+y1'

When these conditions are satisfied, it is ascertained that the mouse pointer stays still within the display-area frame 21. In this case, the display-area-enlargement-start/end detecting unit 11 of the display-area-enlargement-control unit 6 obtains the display-status-control information from the control-information-management unit 9 (step S77). If the display-status-control information indicates an enlarged status (step S78), the display-area-enlargement-start/end detecting unit 11 of the display-area-enlargement-control unit 6 requests the timing unit 12 of the time-measurement unit 7 to start counting time (step S79).

The timing unit 12 of the time-measurement unit 7 stores a current time (tn) as a time-counting start time (t0) when the request for starting to count time is received (step S80). The timing unit 12 of the time-measurement unit 7 constantly checks whether a specified time has arrived by using the following condition (steps S81 and S82).

t0+t1<=tn

FIG. 21A illustrates a situation where this condition is not yet satisfied. FIGS. 21B and 21C show an example in which a passage of 30 seconds is checked.

If this condition is satisfied, it is ascertained that the specified time has arrived. This is reported to the display-area-enlargement-start/end detecting unit 11 of the display-area-enlargement-control unit 6 (step S83). Then, the specified time information is reset, and counting of time is stopped.

Ascertaining now that there is a request for restoring the screen A, the display-area-enlargement-start/end detecting unit 11 obtains from the restoring-display information (C) lines to be displayed after the restoration (step S84), and requests the display-area-restoration-request unit 14 of the display-area-control unit 8 to attend to restoration (step S85).

The display-area-restoration-request unit 14 of the display-area-control unit 8 obtains the display-arearestoration-control information (E), and, also, obtains the display-area-coordinate information (B) from the control-information-management unit 9 (step S87).

Based on the display-area-restoration-control information (a1, b1, x1, y1), (a1, b1, x1, y2), (a3, b3, x3, y3), and (a4, b4, x4, y3) (see FIG. 12) and the display-area-coordinate information (a1', b1', x1', y1'), (a1', b1', x3', y1'), and (a4', b1', x4', y1') (see FIG. 18), the display-coordinate-information updating unit 15 of the display-area-control unit 8 obtains coordinates of display areas that are what they should appear to be after restoration of the content-display area 23 (step S88).

The obtained coordinate information (a1, b1, x1, y1), (a1, b1, x1, y2), (a3, b3, x3, y3), and (a4, b4, x4, y3) is sent to the display terminal 20 to restore the content-display area 23 of the screen A (step S89).

The display-coordinate-information updating unit 15 of the display-area-control unit 8 updates the display-status-control information of the control-information-management unit 9 such that the enlargement flag indicates a standard status (step S65). Further, the display-coordinate-information updating unit 15 updates the display-area-coordinate information (B) to reflect the restored status (step S90).

Setting of Restoring Line

When the content-display area 23 is automatically restored to its original size, a line which was most recently accessed by a user will be displayed at the top of the content-display area 23. This operation will be described below.

Figure 22:
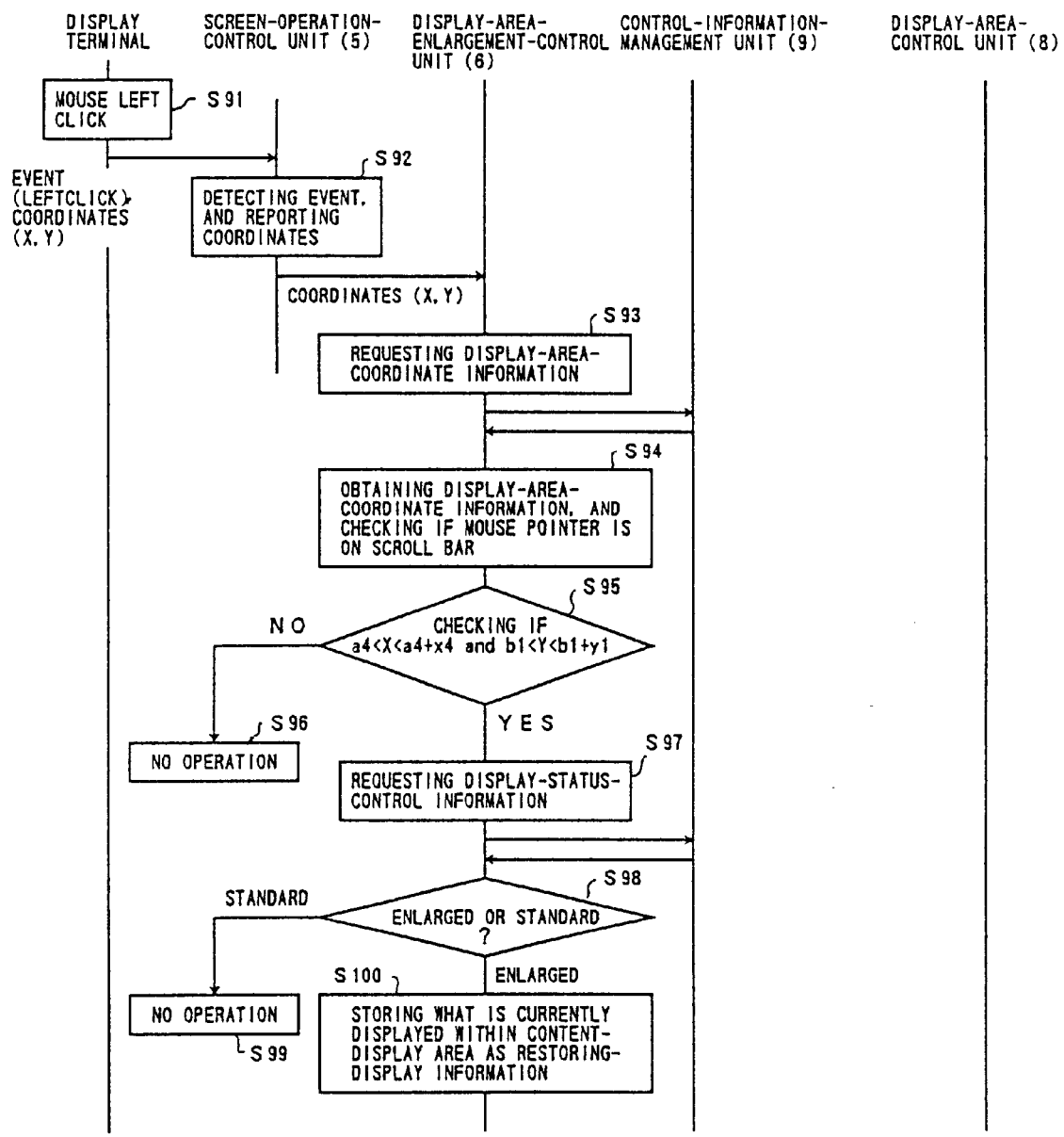
FIG. 22 is a sequence chart showing a process of setting a start line to be restored.
Figure 23:
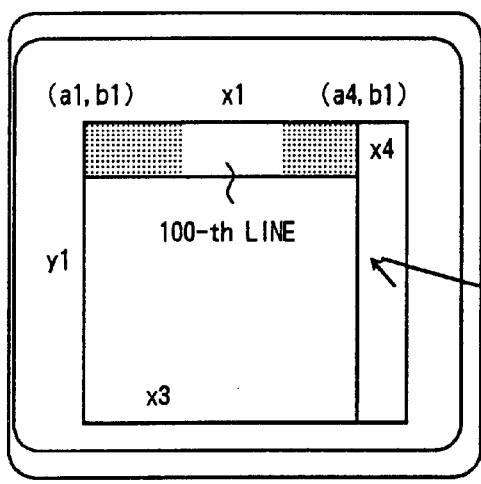
FIG. 23 is an illustrative drawing showing display-status-control information, display-area-coordinate information, and restoring-display information during an enlarged-status period.
Figure 24:
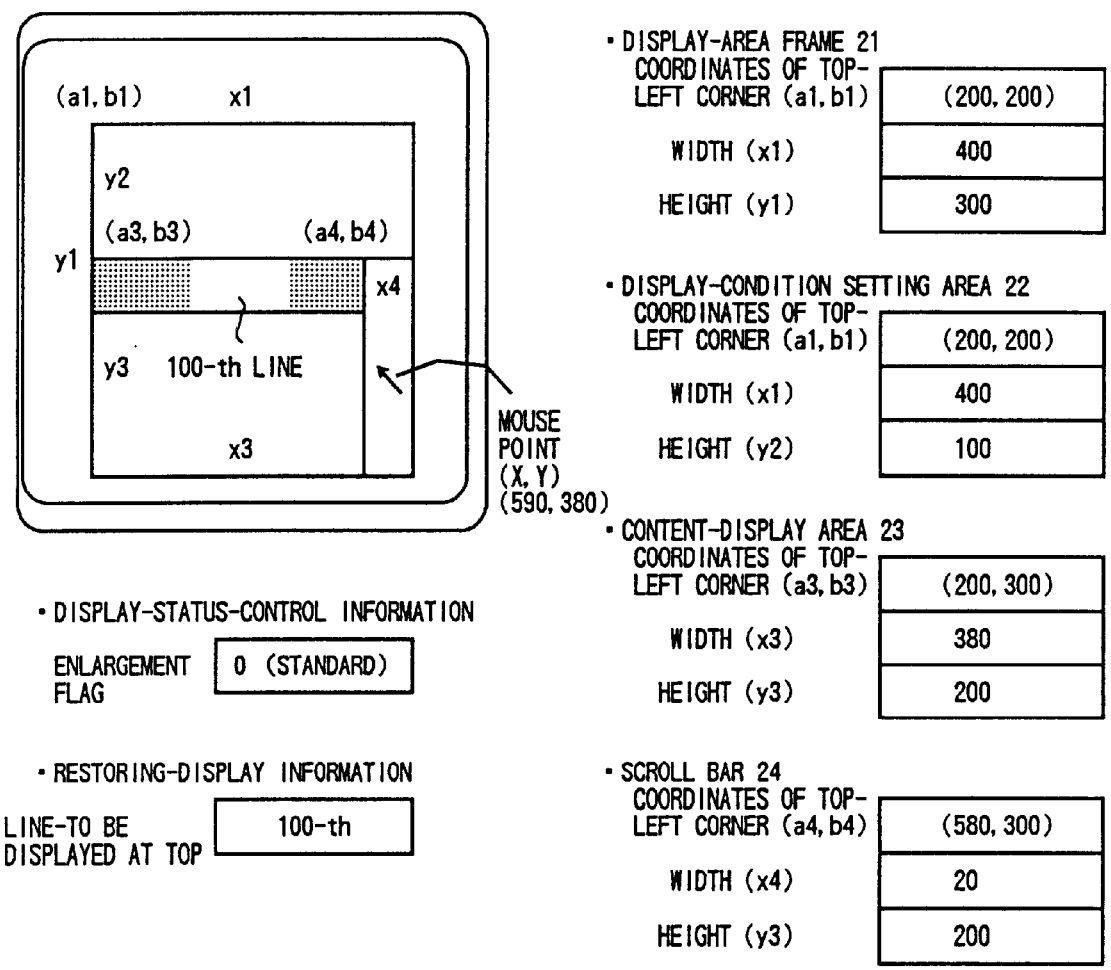
FIG. 24 is an illustrative drawing showing display-status-control information, display-area-coordinate information, and restoring-display information during a standard-status period.

FIG. 22 is a sequence chart showing a process of setting a start line to be restored. FIG. 23 is an illustrative drawing showing display-status-control information, display-area-coordinate information, and restoring-display information during an enlarged-status period. FIG. 24 is an illustrative drawing showing display-status-control information, display-area-coordinate information, and restoring-display information during a standard-status period.

As shown in FIG. 23, the display-area-coordinate information includes data of the display-area frame 21 as top-left-corner coordinates (a1, b1), a width (x1), and a height (y1). Data of the content-display area 23 includes top-left-corner coordinates (a1, b1), a width (x3), and a height (y1). Further, data of the scroll bar 24 is top-left-corner coordinates (a4, b1), a width (x4), and a height (y1). Here, the display is in an enlarged status.

When a user performs a mouse-left-button click at a point (X, Y) (step S91), the screen-operation detecting unit 10 of the screen-operation-control unit 5 detects a click operation (event:leftclick). The screen-operation-control unit 5 reports the click-point coordinates (X, Y) to the display-area-enlargement-start/end detecting unit 11 of the display-area-enlargement-control unit 6 (step S92).

The display-area-enlargement-start/end detecting unit 11 of the display-area-enlargement-control unit 6 obtains the display-area-coordinate information (as shown in FIG. 23) from the control-information-management unit 9 (step S93). Based on the display-area-coordinate information (a4, b1, x4, y1) about the scroll bar 24, a check is made as to whether the mouse pointer is located within an area of the scroll bar 24 (step S94). The check uses the following conditions (step S95).

a4<X<a4+x4 and b1<Y<b1+y1

When these conditions are satisfied, it is ascertained that the mouse pointer is within the scroll bar.

When the mouse pointer is positioned within the scroll bar, the display-area-enlargement-start/end detecting unit 11 of the display-area-enlargement-control unit 6 obtains the display-status-control information from the control-information-management unit 9 (step S97). If the display-status-control information includes an enlargement flag indicative of an enlarged status (step S98), the display-area-enlargement-start/end detecting unit 11 of the display-area-enlargement-control unit 6 ascertains that the mouse click is intended to scroll the content-display area 23.

In response, the display-area-enlargement-start/end detecting unit 11 stores in the restoring-display information what is currently displayed within the content-display area 23 (step S100).

Displaying Lines Starting from Selected Line

Figure 25:
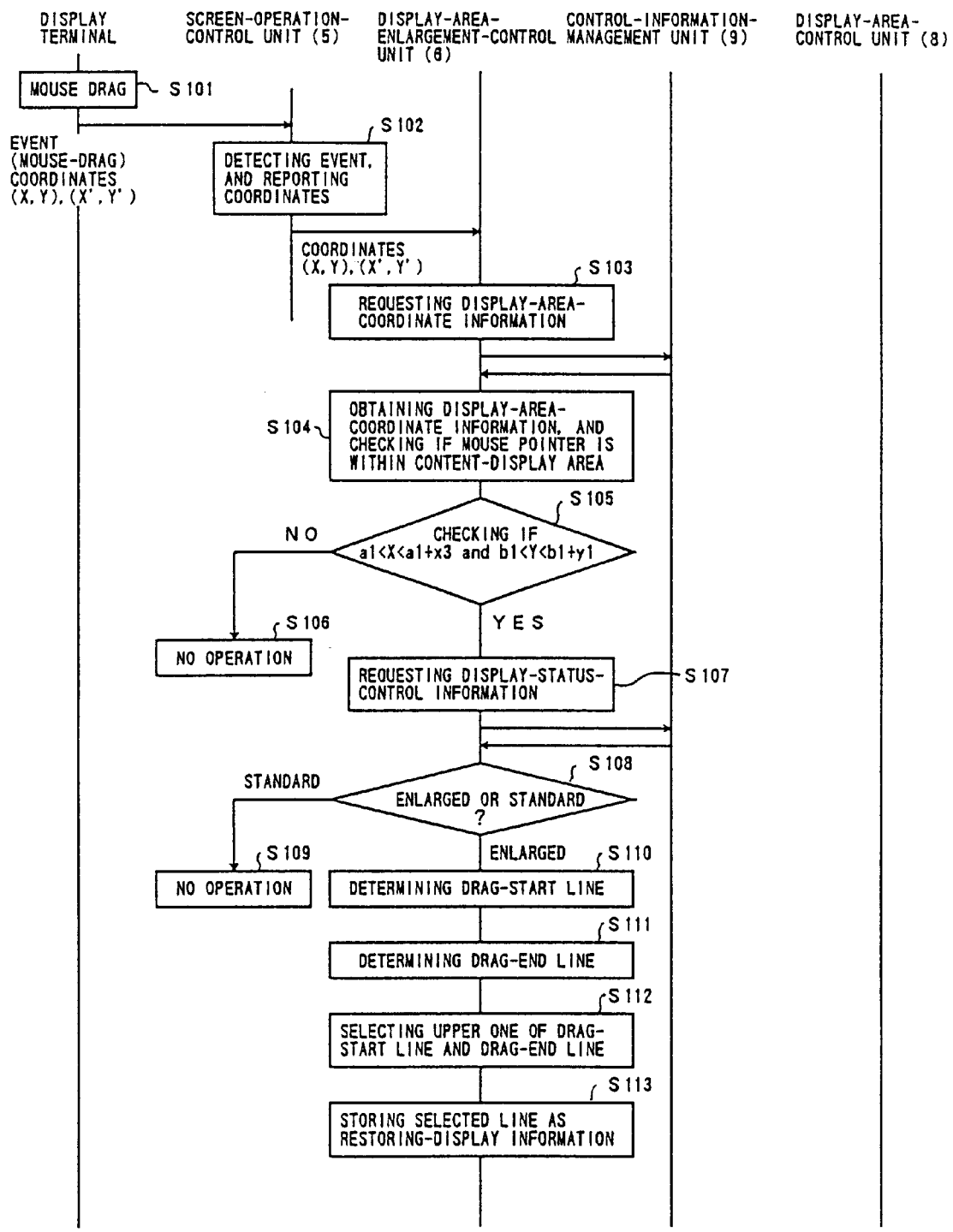
FIG. 25 is a sequence chart showing a process of restoring a display area such as to display lines starting from a selected line.
Figure 26:
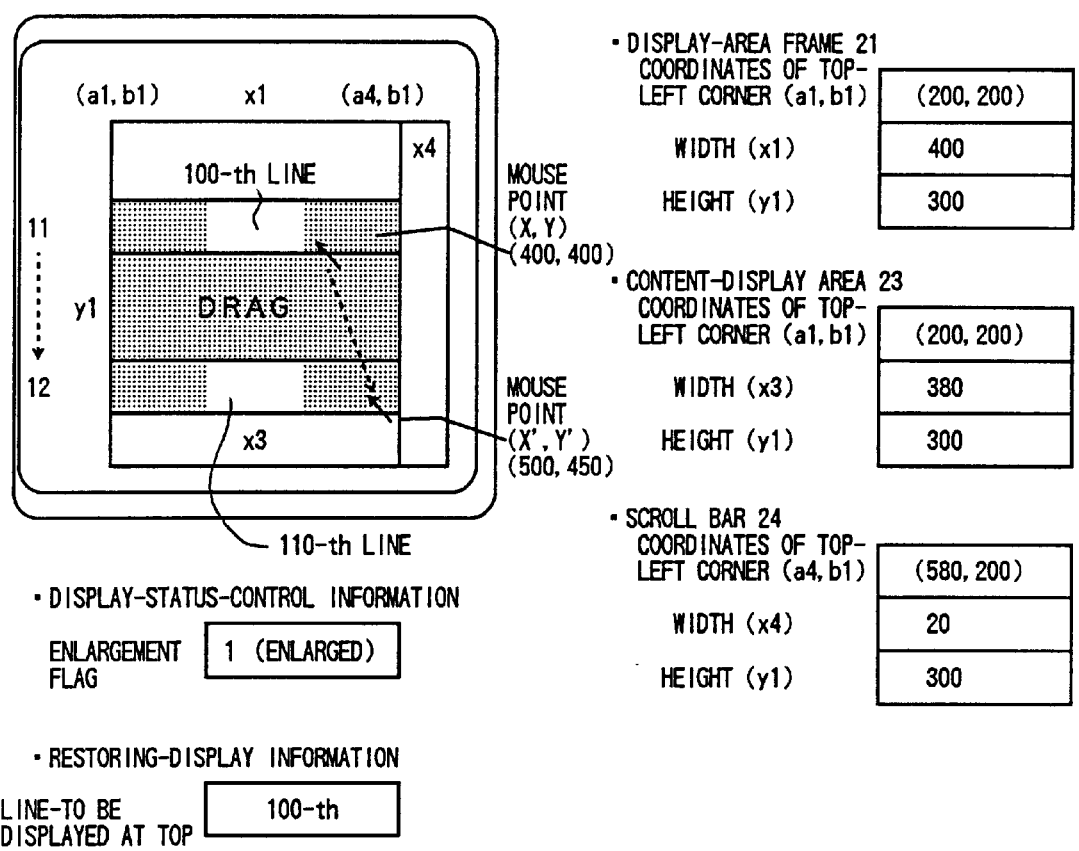
FIG. 26 is an illustrative drawing showing display-status-control information, display-area-coordinate information, and restoring-display information during an enlarged-status period.
Figure 27:
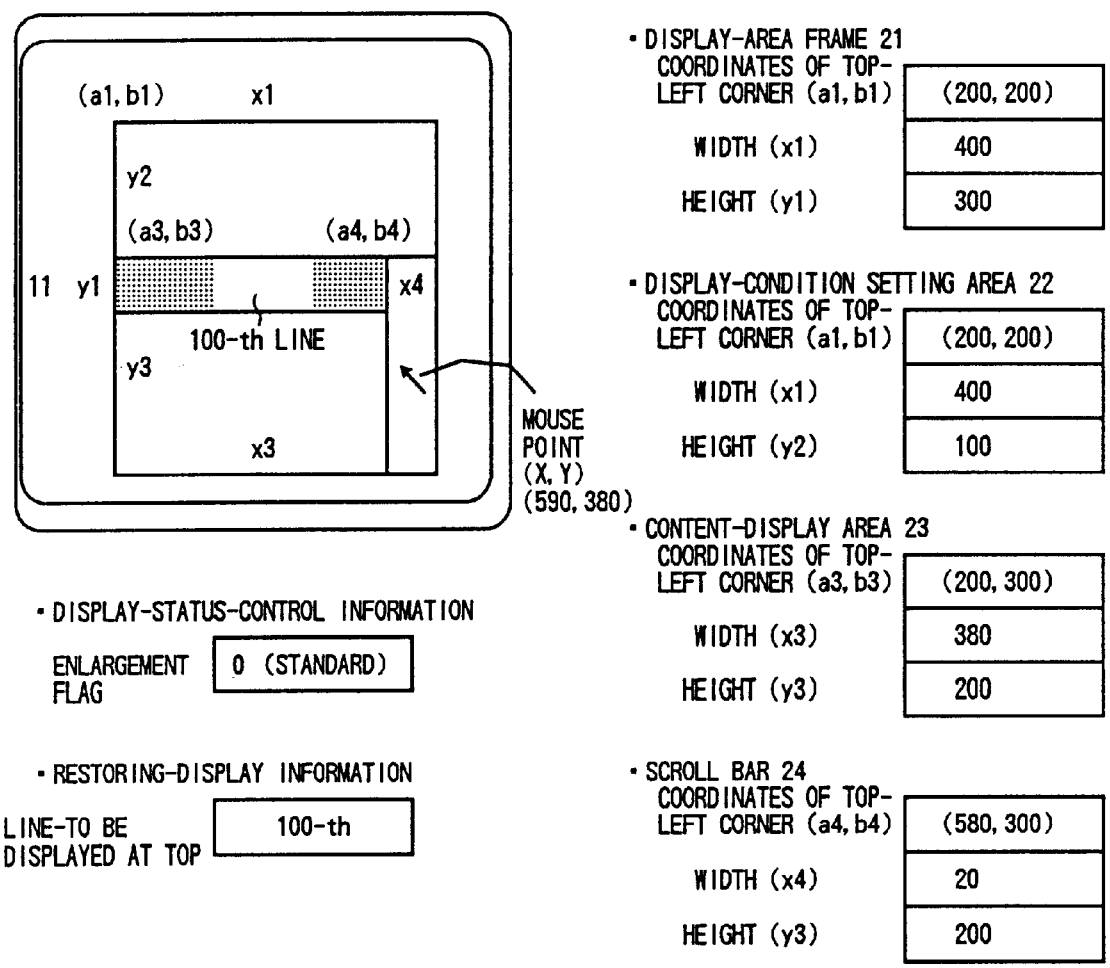
FIG. 27 is an illustrative drawing showing display-status-control information, display-area-coordinate information, and restoring-display information during a standard-status period.

FIG. 25 is a sequence chart showing a process of restoring a display area such as to display lines starting from a selected line. FIG. 26 is an illustrative drawing showing display-status-control information, display-area-coordinate information, and restoring-display information during an enlarged-status period. FIG. 27 is an illustrative drawing showing display-status-control information, display-area-coordinate information, and restoring-display information during a standard-status period.

When the content-display area 23 is in its enlarged form, dragging a mouse pointer of the display terminal 20 in the content-display area 23 serves to indicate a start line to be displayed upon restoration. This operation will be described below.

As shown in FIG. 26, the display-area-coordinate information includes data of the display-area frame 21 as top-left-corner coordinates (a1, b1), a width (x1), and a height (y1). Data of the content-display area 23 includes top-left-corner coordinates (a1, b1), a width (x3), and a height (y1). Further, data of the scroll bar 24 is top-left-corner coordinates (a4, b1), a width (x4), and a height (y1). Here, the display is in an enlarged status.

When a user performs a mouse-drag operation from a point (X, Y) to a point (X', Y') within the content-display area 23 (step S101), the screen-operation detecting unit 10 of the screen-operation-control unit 5 detects this mouse-drag operation (event:drag). The screen-operation-control unit 5 reports the mouse-drag coordinates (X, Y) and (X', Y') to the display-area-enlargement-start/end detecting unit 11 of the display-area-enlargement-control unit 6 (step S102).

The display-area-enlargement-start/end detecting unit 11 of the display-area-enlargement-control unit 6 obtains the display-area-coordinate information (as shown in FIG. 26) from the control-information-management unit 9 (step S103). Based on the display-area-coordinate information (a1, b1, x3, y1) about the content-display area 23, a check is made as to whether the mouse pointer is located within the content-display area (step S104). The check uses the following conditions (step S105).

a1<X<a1+x3 and b1<Y<b1+y1

When these conditions are satisfied, it is ascertained that the mouse-drag operation was carried out within the content-display area. When the mouse-drag operation took place inside the content-display area, the display-area-enlargement-start/end detecting unit 11 of the display-area-enlargement-control unit 6 obtains the display-status-control information from the control-information-management unit 9 (step S107). If the display-status-control information includes an enlargement flag indicative of an enlarged status (step S108), the display-area-enlargement-start/end detecting unit 11 of the display-area-enlargement-control unit 6 ascertains that the mouse-drag operation is intended to indicate a start line to be displayed upon restoration.

As shown in FIG. 26, a line number 100 of a line at a drag-start point is obtained from the drag-start coordinates (X, Y) and the coordinates of the content-display area (step S110). In the same manner, a line number 110 of a line at the drag-end point (X', Y') is obtained from the drag-end coordinates (X', Y') and the coordinates of the content-display area (step S111). Then, a comparison is made between the line number 100 and the line number 110 (step S112), and the smallest of these two is stored in the restoring-display information (C) (step S113). It should be noted that a drag-start point can be below a drag-end point when a mouse-drag operation is directed upward.

The restoring-display information (C) is referred to by the display-area-enlargement-start/end detecting unit 11 of the display-area-enlargement-control unit 6 at a time of restoration. As a result, lines are displayed upon restoration such that a line indicated by the restoring-display information (C) is shown at the very top.

Figure 28:
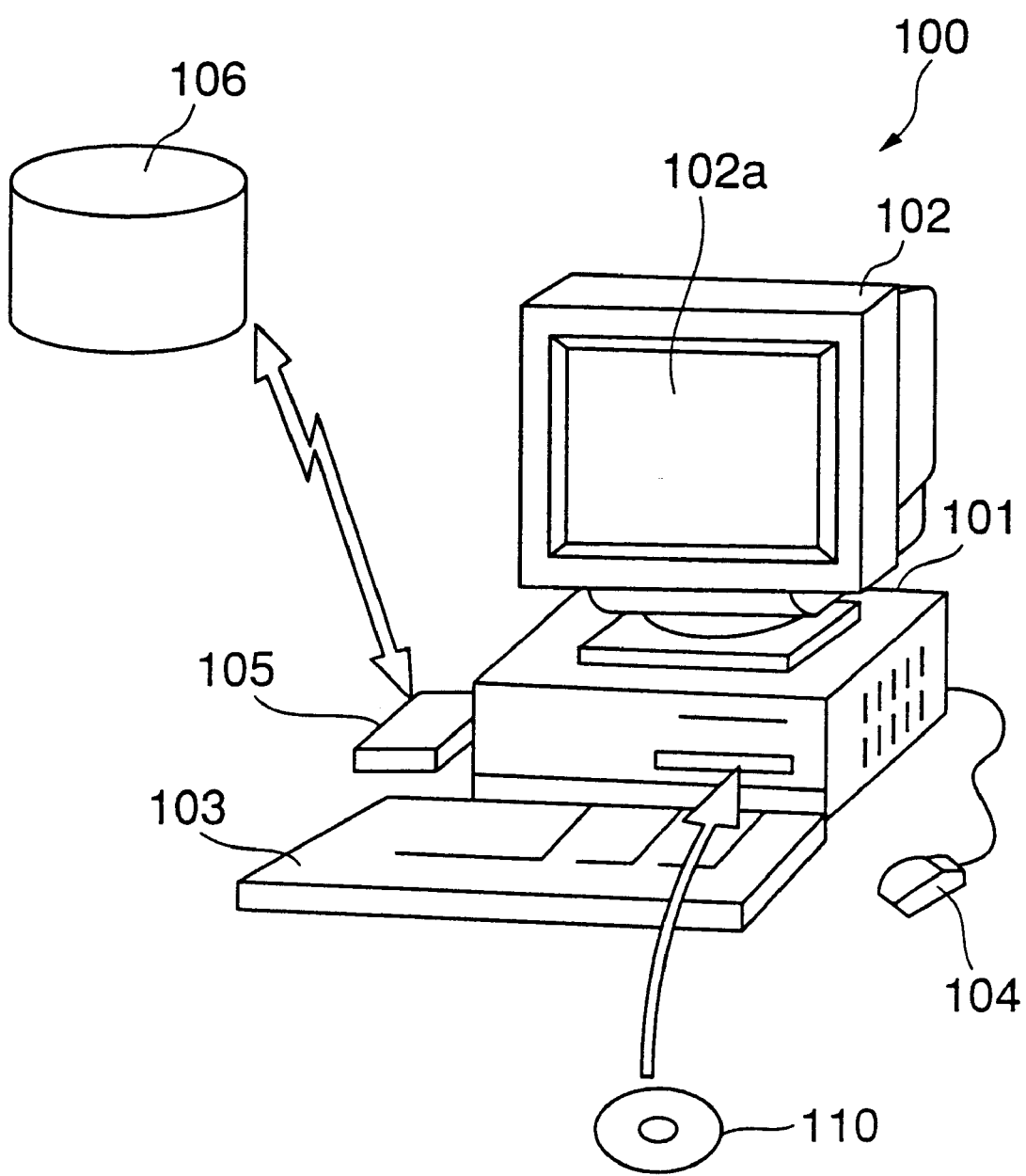
FIG. 28 is an illustrative drawing showing an example of a computer system for implementing the present invention.

FIG. 28 is an illustrative drawing showing an example of a computer system for implementing the present invention.

The present invention may be implemented by using a computer system 100. The computer system 100 includes a computer 101, a display 102, a keyboard 103, a mouse 104, and a modem 105. The computer 101 includes a CPU, memories, a disk-drive, etc. The display 102 shows an image on a screen 102a in response to data sent from the computer 101. The keyboard 103 is used for inputting various information to the computer 101. The mouse 104 is used for indicating a point on the screen 102a. The modem 105 provides access to a remote database 106.

A display-control program according to the present invention may be provided via a detachable memory medium such as a memory disk 110, or may be downloaded from the remote database 106 via the modem 105.

The display-control program is executed by the CPU of the computer 101.

In the embodiments described above, a mouse-click on the scroll bar is used as an example of a user screen operation that implicitly requests display enlargement. It should be noted that the mouse-click operation on the scroll bar can be simply replaced by a move of the mouse pointer into a display area or by a stay of the mouse pointer inside the display area for more than a predetermined time period. Software programmers having ordinary skill should be able to easily make such alterations once instructions are given with regard to the changes.

The embodiments described above have been described with reference to examples in which a display area is enlarged to display more contents. The present invention is not limited to these examples, and is applicable to displaying a larger amount of contents without enlarging a display area.

Further, the embodiments described above were directed to use of a mouse as a pointing device. It should be noted, however, that the present invention is equally applicable to use of a pointing device of a different type such as a touch pad, a track ball, a pointing stick, etc.

Moreover, a click operation of the present invention may be a single click or a double click, and a drag operation may be achieved by other means.

An enlargement of a display area may be performed within confines of a window. This configuration does not affect visibility and manipulability of other windows. A display area, however, may be enlarged beyond confines of a window, possibly utilizing the entirety of a device screen, thereby achieving displaying of a larger amount of information. Information displayed in the window may be text information, image information, etc.

As described above, the present invention allows a user to increase the amount of displayed contents by automatically detecting a user request without requiring additional operations from the user, thereby providing a user-friendly interface for increasing presented information.

Further, an increase in the amount of presented information is achieved without affecting other display areas, so that there is no need to relocate other display areas. This allows a user to refer to information shown in other display areas while working on the information-enlarged display.

Since the contents to be displayed in an increased amount may be filtered according to what is desired by the user, the present invention achieves information presentation meeting various demands of the user.

A display area may be restored by presenting lines that were shown on the latest display or lines that start from a user-specified line. This makes it possible to display the most necessary information without relying on the user's memory.

Moreover, a restored display area may present the most necessary information as described above even after the contents are filtered according to user preference at the time of an increased-amount presentation. This provides a flexible information presentation coping with various user demands.

Further, the present invention is not limited to these embodiments, but various variations and modifications may be made without departing from the scope of the present invention.

The present application is based on Japanese priority application No. 11-040142 filed on Feb. 18, 1999, with the Japanese Patent Office, the entire contents of which are hereby incorporated by reference.

What is claimed is:

1. A device for controlling multi-window display on a screen, comprising:

a screen-operation detecting unit which detects user screen operations including a user operation of a pointer on the screen;

a control unit which controls a window to increase an amount of information displayed therein when said screen-operation detecting unit detects a move of the pointer into an area of the window; and a time-measurement unit for counting time, wherein said control unit controls the window to increase the amount of information displayed therein when the pointer stays inside the area of the window for a predetermined time period counted by said time-measurement unit after the move of the pointer into the area of the window, wherein said control unit controls the window to restore an original state thereof when said screen-operation detecting unit detects no user operation with respect to the window for a predetermined time period.

2. The device as claimed in claim 1, wherein said control unit controls the window to increase the amount of information displayed therein when said screen-operation detecting unit further detects a pointer click on a scroll bar of the window after the move of the pointer into the area of the window.

3. The device as claimed in claim 1, wherein said control unit controls the window to increase the amount of information displayed therein by enlarging a size of the window.

4. The device as claimed in claim 1, wherein said control unit displays a content-display area and a condition setting area within the window, and stores a content screening condition when said screen-operation detecting unit detects a user operation indicating the content screening condition on the condition setting area, said control unit displaying the information in the content-display area after screening the information based on the content screening condition.

5. The device as claimed in claim 1, wherein said control unit restores the window to an original state thereof when said screen-operation detecting unit detects a move of the pointer out of the area of the window.

6. A device for controlling multi-window display on a screen, comprising:
 a screen-operation detecting unit which detects user screen operations including a user operation of a pointer on the screen;
 a control unit which controls a window to increase an amount of information displayed therein when said screen-operation detecting unit detects a move of the pointer into an area of the window;
 a memory which stores a position indicator indicative of a user-specified portion of the information displayed in the window, and said control unit restores the window to an original state thereof such that the portion of the information indicated by the position indicator is displayed at a top of the information in the restored window, and
 a time-measurement unit for counting time,
 wherein said control unit controls the window to increase the amount of information displayed therein when the pointer stays inside the area of the window for a predetermined time period counted by said time-measurement unit after the move of the pointer into the area of the window.

7. The device as claimed in claim 6, wherein said user-specified portion of the information is a portion displayed at a top of the information in the window before restoration thereof.

8. A method of controlling multi-window display on a screen, comprising:
 detecting user screen operations including a user operation of a pointer on the screen;
 controlling a window to increase an amount of information displayed therein when a move of the pointer into an area of the window is detected;
 controlling the window to restore an original state thereof when no user operation with respect to the window for a predetermined time period is detected; and
 counting time,
 wherein the window is controlled to increase the amount of information displayed therein when the pointer stays inside the area of the window for a predetermined time period counted after the move of the pointer into the area of the window.

9. The method as claimed in claim 8, wherein said window is controlled to increase the amount of information displayed therein when a pointer click on a scroll bar of the window after the move of the pointer into the area of the window is detected.

10. The method as claimed in claim 8, wherein said window is controlled to increase the amount of information displayed therein by enlarging a size of the window.

11. The method as claimed in claim 8, further comprising:
 displaying a content-display area and a condition setting area within the window;
 storing a content screening condition when a user operation indicating the content screening condition on the condition setting area is detected; and
 displaying the information in the content-display area after screening the information based on the content screening condition.

12. The method as claimed in claim 8, further comprising restoring the window to an original state thereof when a move of the pointer out of the area of the window is detected.

13. A method of controlling multi-window display on a screen, comprising:
 detecting user screen operations including a user operation of a pointer on the screen;
 controlling a window to increase an amount of information displayed therein when a move of the pointer into an area of the window is detected;
 storing a position indicator indicative of a user-specified portion of the information displayed in the window;
 restoring the window to an original state thereof such that the portion of the information indicated by the position indicator is displayed at a top of the information in the restored window; and
 counting time,
 wherein the window is controlled to increase the amount of information displayed therein when the pointer stays inside the area of the window for a predetermined time period counted after the move of the pointer into the area of the window.

14. The method as claimed in claim 13, wherein said user-specified portion of the information is a portion displayed at a top of the information in the window before restoration thereof.

15. A machine-readable medium having a program embodied therein for controlling a computer to control multi-window display on a screen, said program comprising:
 a screen-operation detecting unit configured to detect user screen operations including a user operation of a pointer on the screen;
 a control unit configured to control a window to increase an amount of information displayed therein when said screen-operation detecting unit detects a move of the pointer into an area of the window; and
 a time-measurement unit configured to count time,
 wherein said control unit controls the window to increase the amount of information displayed therein when the pointer stays inside the area of the window for a predetermined time period counted by said time-measurement unit after the move of the pointer into the area of the window,
 wherein said control unit controls the window to restore an original state thereof when said screen-operation detecting unit detects no user operation with respect to the window for a predetermined time period.

16. The machine-readable medium as claimed in claim 15, wherein said control unit controls the window to increase the amount of information displayed therein when said screen-operation detecting unit further detects a pointer click on a scroll bar of the window after the move of the pointer into the area of the window.

17. The machine-readable medium as claimed in claim 15, wherein said control unit controls the window to increase the amount of information displayed therein by enlarging a size of the window.

18. The machine-readable medium as claimed in claim 15, wherein said control unit displays a content-display area and a condition setting area within the window, and stores a content screening condition when said screen-operation detecting unit detects a user operation indicating the content screening condition on the condition setting area, said control unit displaying the information in the content-display area after screening the information based on the content screening condition.

19. The machine-readable medium as claimed in claim 15, wherein said control unit restores the window to an original state thereof when said screen-operation detecting unit detects a move of the pointer out of the area of the window.

20. A machine-readable medium having a program embodied therein for controlling a computer to control multi-window display on a screen, said program comprising:

a screen-operation detecting unit configured to detect user screen operations including a user operation of a pointer on the screen;

a control unit configured to control a window to increase an amount of information displayed therein when said screen-operation detecting unit detects a move of the pointer into an area of the window;

a position indicator unit configured to indicate a user-specified portion of the information displayed in the window, and said control unit restores the window to an original state thereof such that the portion of the information indicated by the position indicator unit is displayed at a top of the information in the restored window; and a time-measurement unit configured to count time, wherein said control unit controls the window to increase the amount of information displayed therein when the pointer stays inside the area of the window for a predetermined time period counted by said time-measurement unit after the move of the pointer into the area of the window.

21. The machine-readable medium as claimed in claim 20, wherein said user-specified portion of the information is a portion displayed at a top of the information in the window before restoration thereof.

* * * * *